United States Patent [19]

Kondo et al.

[11] Patent Number: 5,023,710

[45] Date of Patent: Jun. 11, 1991

[54] HIGHLY EFFICIENT CODING APPARATUS

[75] Inventors: Tetsujiro Kondo, Kanagawa; Michio Nagai, Saitama; Norihisa Shirota, Kanagawa, all of Japan

[73] Assignee: Sony Corporation, Tokyo, Japan

[21] Appl. No.: 602,477

[22] Filed: Oct. 24, 1990

[30] Foreign Application Priority Data

Dec. 16, 1988 [JP] Japan ................... 63-317736

[51] Int. Cl.$^5$ .................... H04N 7/13; H04N 11/00
[52] U.S. Cl. ...................... 358/133; 358/147; 358/335
[58] Field of Search ............... 358/133, 13, 147, 335, 358/339

[56] References Cited

U.S. PATENT DOCUMENTS

| | | | |
|---|---|---|---|
| 4,575,770 | 3/1986 | Dieterich | 358/147 |
| 4,626,912 | 12/1986 | Wilkinson | 358/339 |
| 4,680,766 | 7/1987 | Wilkinson | 358/339 |
| 4,703,352 | 10/1987 | Kondo | 358/135 |
| 4,722,003 | 1/1988 | Kondo | 358/135 |
| 4,729,021 | 3/1988 | Kondo | 358/135 |
| 4,754,336 | 6/1988 | Nishizawa | 358/261.1 |
| 4,845,560 | 7/1989 | Kondo | 358/133 |
| 4,931,879 | 6/1990 | Koga | 358/133 |

FOREIGN PATENT DOCUMENTS

| | | |
|---|---|---|
| 0185533 | 6/1986 | European Pat. Off. . |
| 0222592 | 5/1987 | European Pat. Off. . |
| 0225181 | 6/1987 | European Pat. Off. . |
| 0230632 | 8/1987 | European Pat. Off. . |
| 0293189 | 11/1988 | European Pat. Off. . |

Primary Examiner—Howard W. Britton
Attorney, Agent, or Firm—Alvin Sinderbrand; Willian S. Frommer

[57] ABSTRACT

A highly efficient coding apparatus is configured to divide a digital picture signal into picture blocks and, based on a signal from a coding circuit for performing variable-length coding of each picture block, generate an output signal in the form of serial sync blocks. By inserting the most significant bit of a coded output signal for each picture element in a predetermined position of each sync block, a reproduced picture is obtained in a picture search mode in which a magnetic head scans a video tape across a plurality of tracks.

7 Claims, 21 Drawing Sheets

4 PIXELS
4 LINES
A12
A11

| BIT LENGTH / MDT | 0 | 1 | 2 | 3 | 4 |
|---|---|---|---|---|---|
| 0  0 | 0 BYTE | 2 | 4 | 6 | 8 |
| 1  1 | 0 | 4 | 8 | 12 | 16 |

| Fig.4A | Fig.4B |

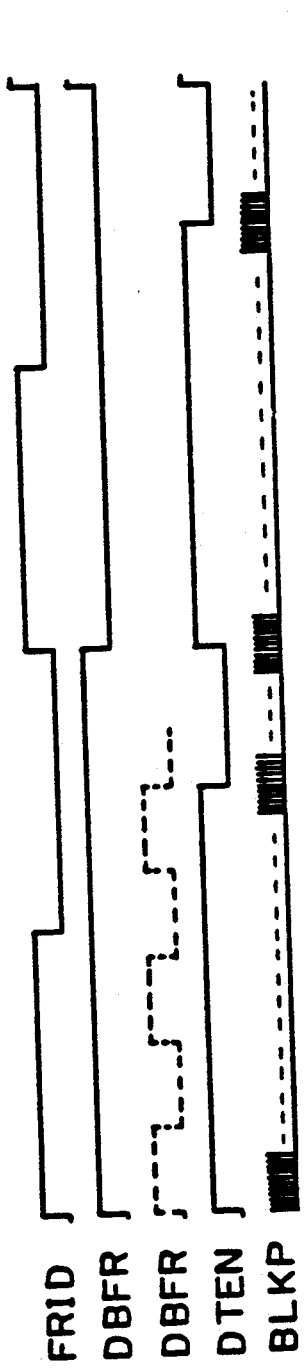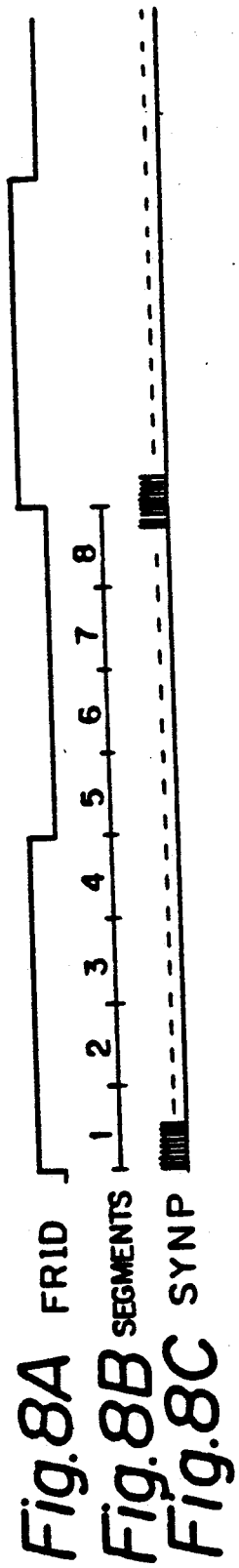

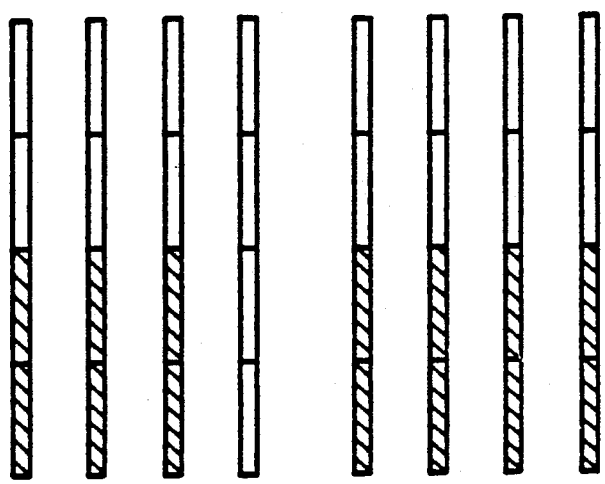
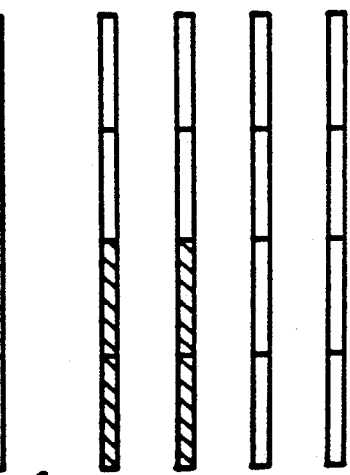
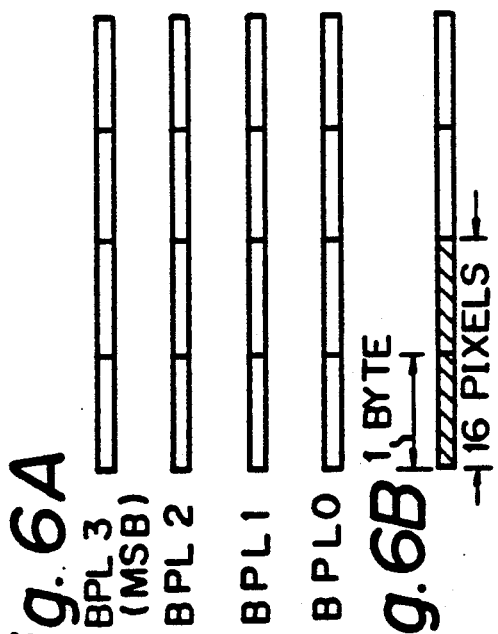
Fig. 6A, Fig. 6B, Fig. 6C, Fig. 6D, Fig. 6E

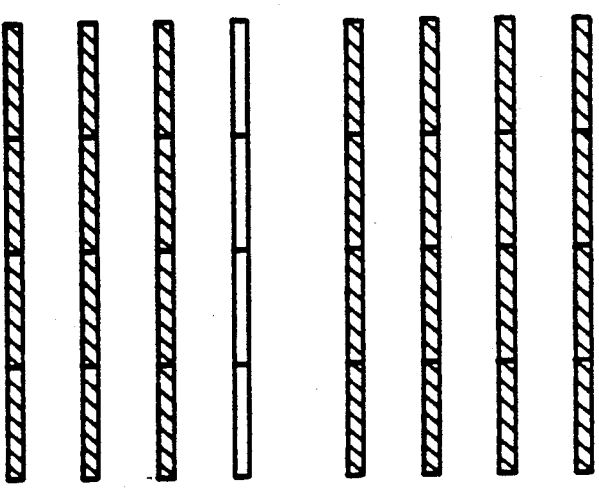
Fig. 7D
Fig. 7E
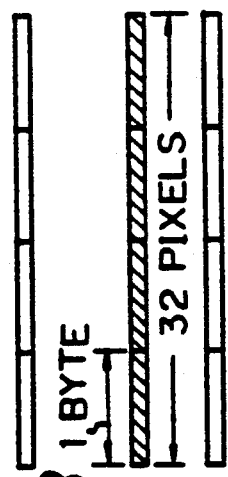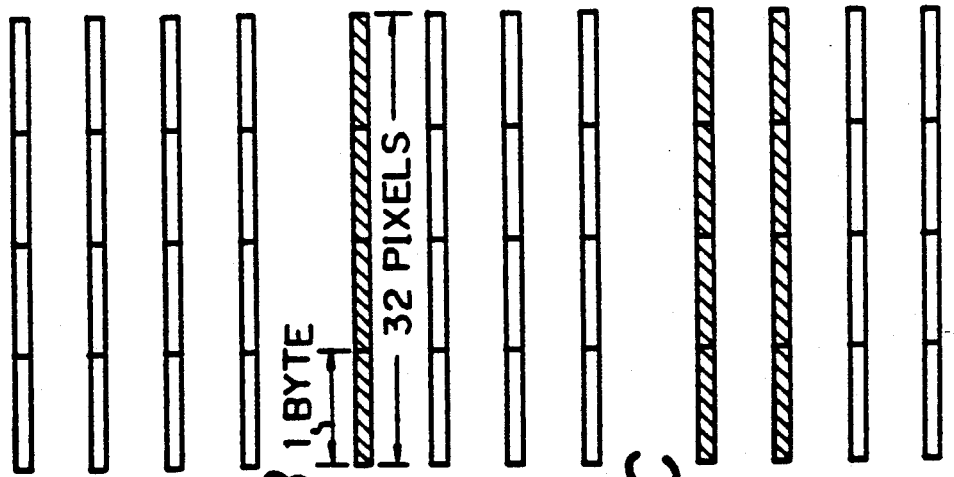
Fig. 7A
Fig. 7B  1 BYTE  32 PIXELS
Fig. 7C

Fig. 8D

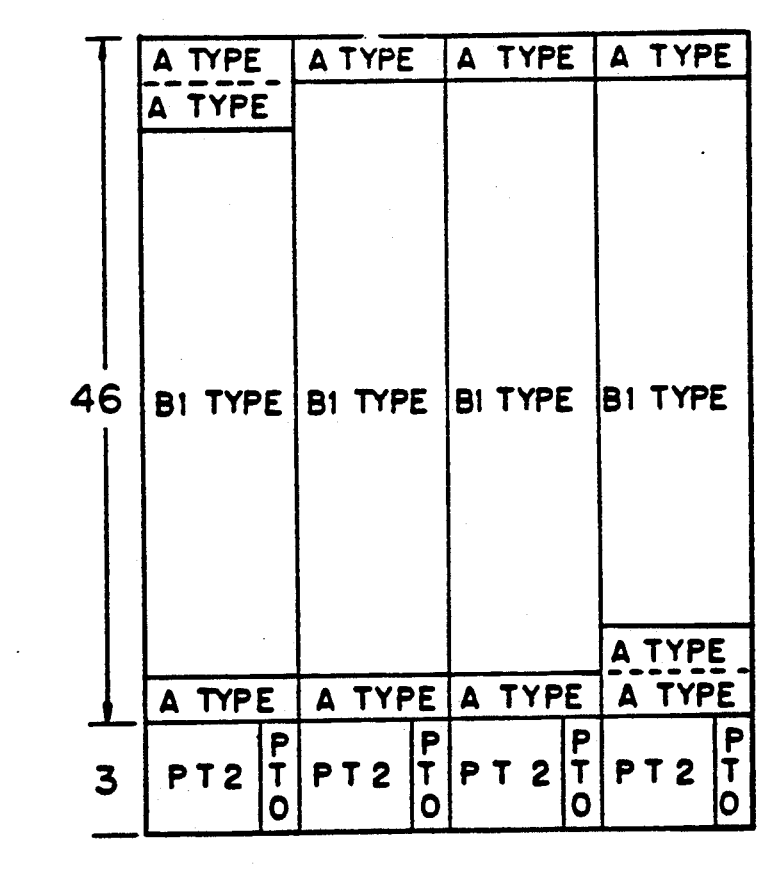

|   | A TYPE | A TYPE | A TYPE | A TYPE |   |
|---|--------|--------|--------|--------|---|
|   | A TYPE |        |        |        |   |
| 46 | B1 TYPE | B1 TYPE | B1 TYPE | B1 TYPE |   |
|   |        |        |        | A TYPE |   |
|   | A TYPE | A TYPE | A TYPE | A TYPE |   |
| 3 | PT2 | PTO | PT2 | PTO | PT2 | PTO | PT2 | PTO |

Fig. 8F B1 TYPE

Fig. 8H B2 TYPE

Fig. 8I A TYPE

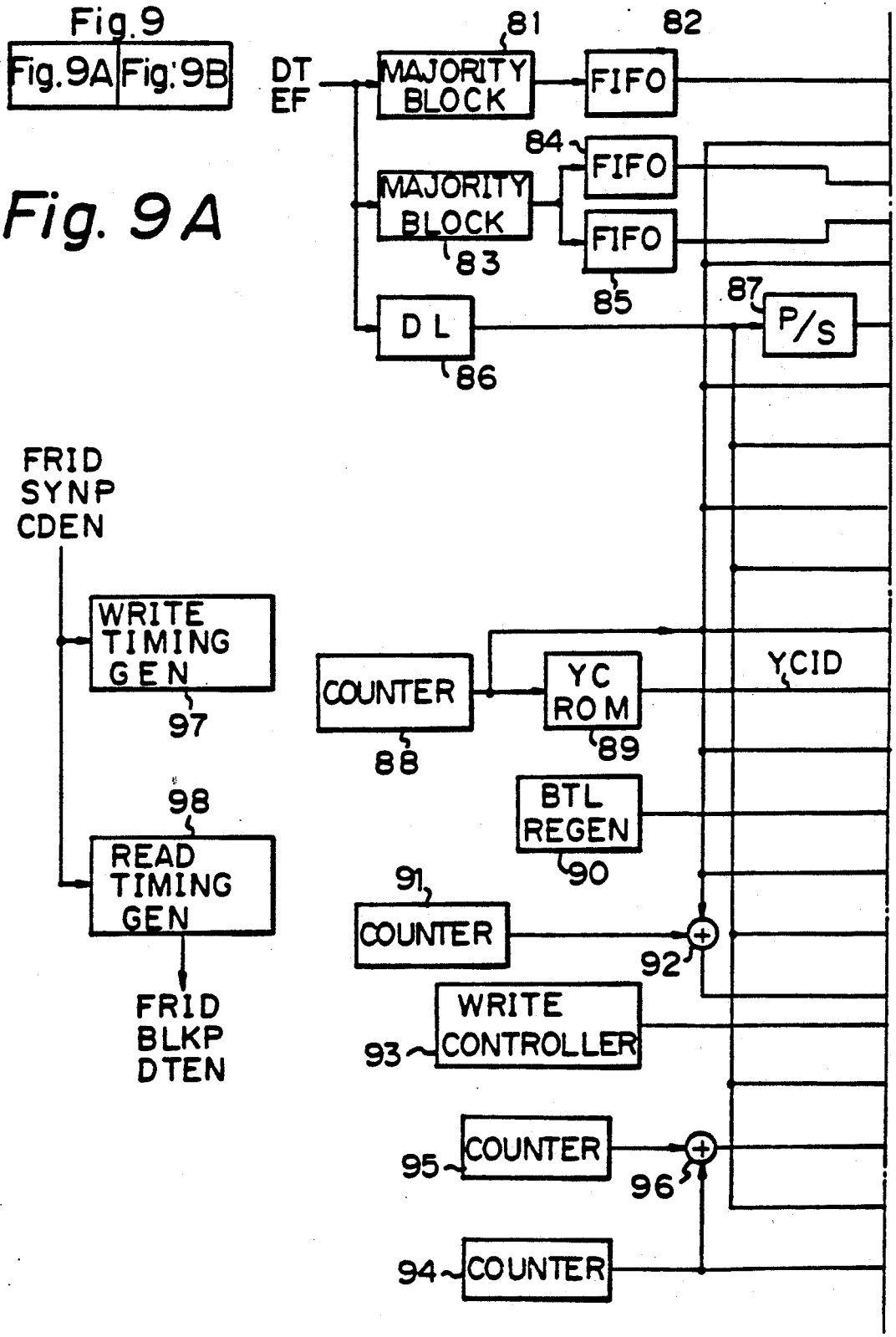

Fig.11B { DBFR 1 0 1 0 1 0 1 0 1
THR THR(n) THR(n+1) THR(n+2) THR(n+3) THR(n+4) THR(n+5) THR(n+6) THR(n+7) THR(n+8)

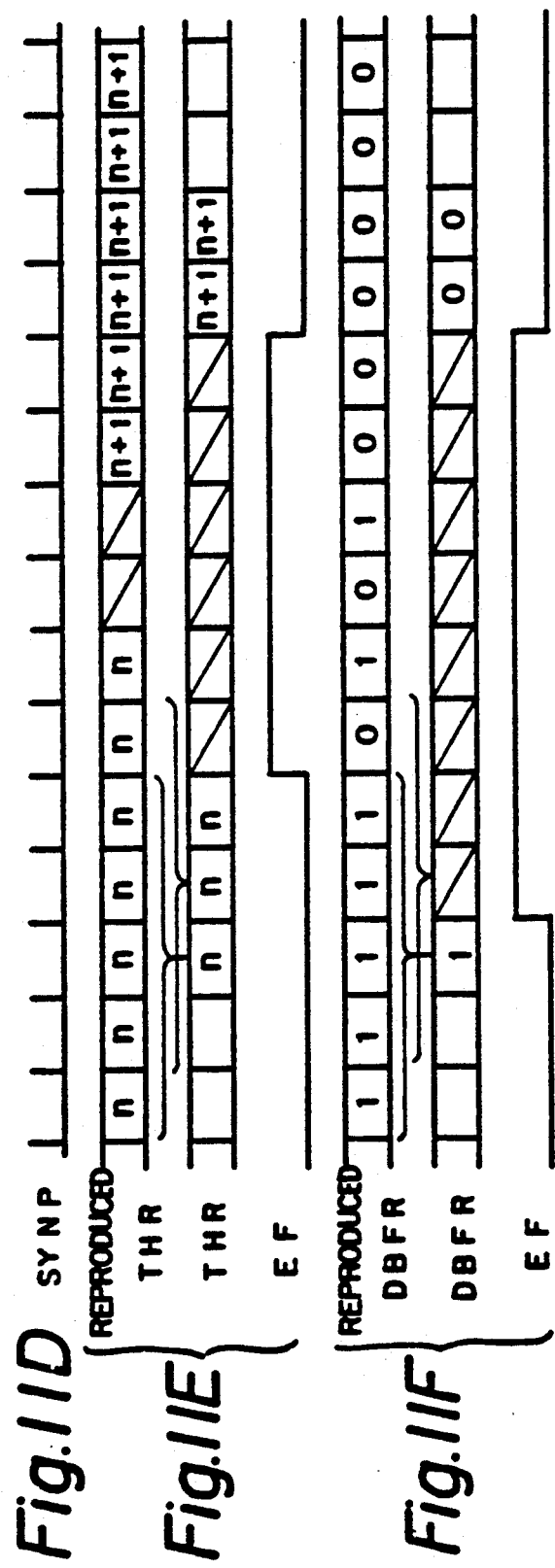

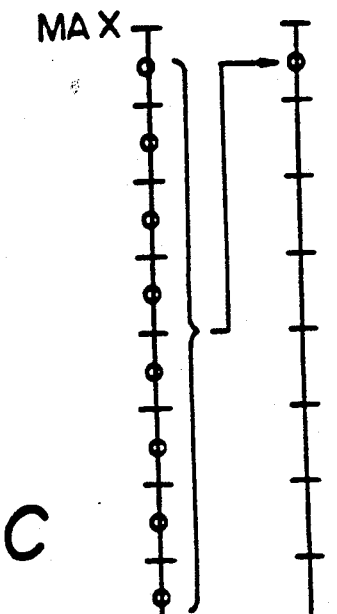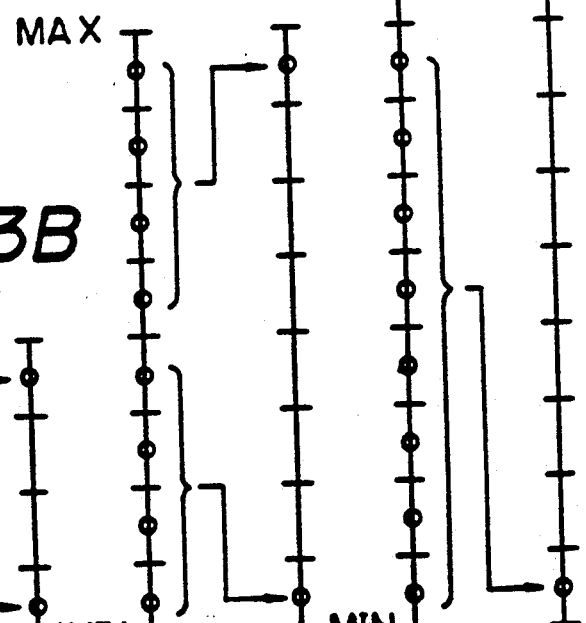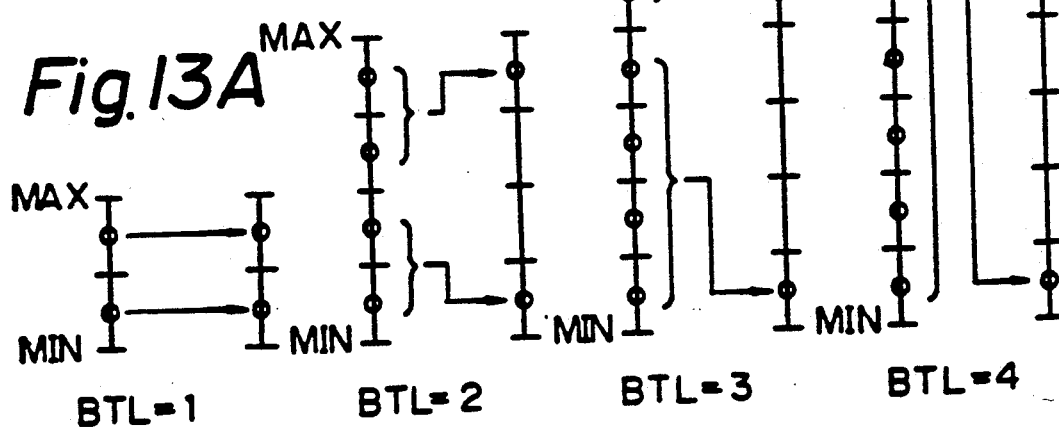

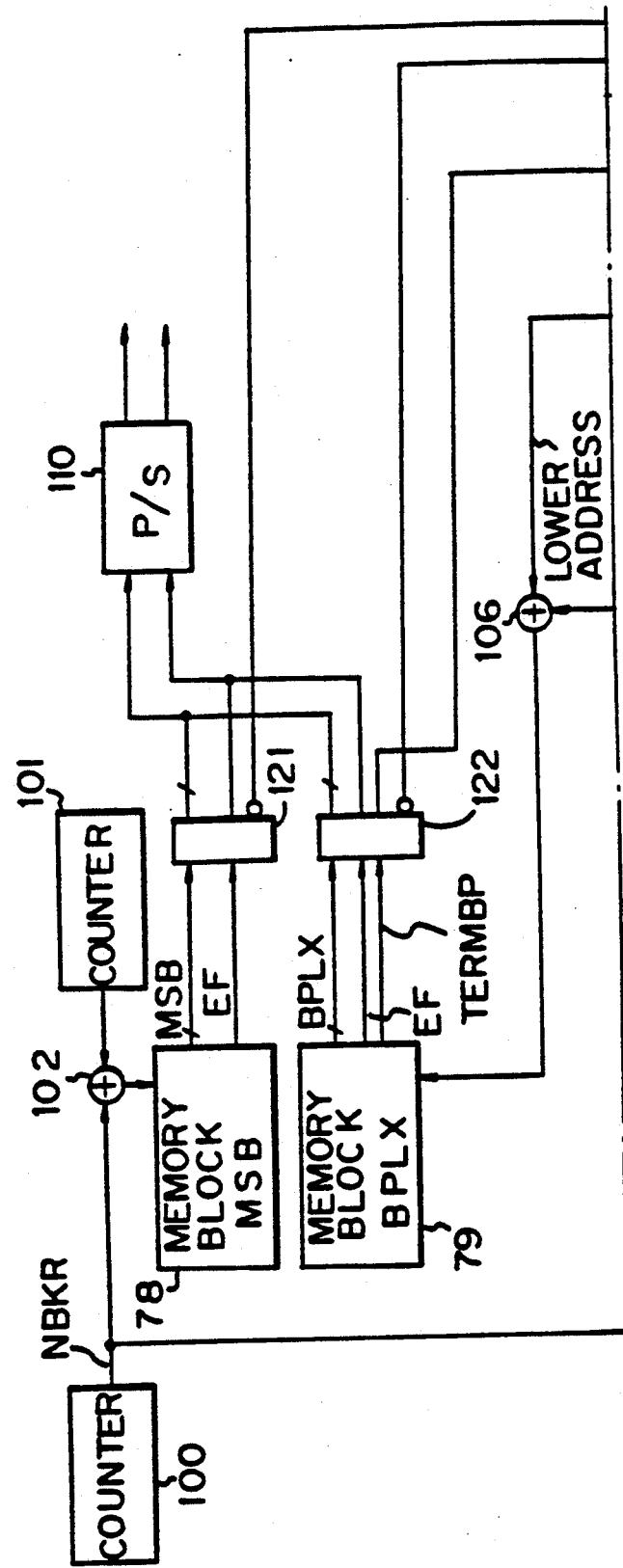

HIGHLY EFFICIENT CODING APPARATUS

This application is a continuation of application Ser. No. 07/447,420, filed Dec. 7, 1989, abandoned.

BACKGROUND OF THE INVENTION

1. Field of the Invention

This invention relates to a highly efficient coding apparatus applicable to a digital video type recording and/or reproducing apparatus (VTR) configured to compress the amount of data of a digital picture signal and record it on a magnetic tape, using a rotary head.

2. Description of the Prior Art

The assignee of the present application has previously proposed a highly efficient coding apparatus, as disclosed in the specification of Japanese Patent Publication No. 144989/1986, which obtains a dynamic range defined by maximum and minimum values of a plurality of picture elements contained in a two-dimensional block and performs coding which is adapted to the dynamic range. Another highly efficient coding apparatus is described in the specification of Japanese Patent Publication No. 92620/1987, which performs coding adapted to the dynamic range of a three-dimensional block consisting of picture elements of areas included in a plurality of respective frames. Moreover, a variable-length coding method is described in the specification of Japanese Patent Publication No. 128621/1987, in which the number of bits used varies in response to the dynamic range so as to maintain the maximum distortion produced upon digitization at a constant value.

The aforementioned highly efficient coding method (called ADRC) which adapts to a respective dynamic range permits significant compression of the amount of data to be transmitted and is therefore suitable for use in a digital VTR. In particular, the variable-length ADRC method can increase the compression rate. However, since the variable-length ADRC method is subject to variations in the amount of transmitted data with the contents of the picture, buffering is required when using a transmission path having a fixed rate, such as in a digital VTR configured to record a predetermined amount of data in one track.

The assignee of the present application has already proposed a buffering apparatus as disclosed in, for example, the specification of Japanese Patent Publication No. 111781/1989, which obtains the frequency distribution of dynamic ranges, converts it into a cumulative type distribution, subsequently obtains the amount of generated data, supplying coding thresholds to the cumulative type distribution, and determines the thresholds such that the amount of generated information does not exceed the transmission rate.

An explanation of buffering is presented below where the bit lengths of picture element codes of variable-length ADRC are (0 to 4). Let the thresholds for coding be T1 to T4 (where T1 > T2 > T3 > T4). Then the bit length is 4 for a picture block having a dynamic range DR of (maximum value to T1), the bit length is 3 for a picture block having a dynamic range DR of (T1 to T2), the bit length is 2 for a picture block having a dynamic range DR of (T2-1 to T3), the bit length is 1 for a picture block having a dynamic range DR of (T3-1 to T4), and the bit length is 0 (no picture element code is transmitted) for a picture block having a dynamic range DR of (T4-1 to the minimum value). 32 sets of threshold combinations for the thresholds T1 through T4 are originally prepared. These sets of thresholds are so arranged that the use of the first set of thresholds results in the maximum amount of generated information, and the use of the 32nd set of thresholds results in the minimum amount of generated information, while gradually and monotonically decreasing the amount of generated information from the first set of thresholds to the 32nd. Respective sets of thresholds are distinguished by threshold codes of five bits.

A table of the frequency distribution for the occurrence of dynamic ranges DR of a number of picture blocks contained in a two-frame period of the entered video data is made. This processing may be carried out by adding +1 to the data to be written in each address of a memory (RAM), where the address is the dynamic range DR. By accumulating the frequency of each address, the table of the frequency distribution becomes a cumulative type. The amount of generated information can be obtained from the application of the above-indicated sets of thresholds to the cumulative type frequency distribution table. A set of thresholds is selected so that the amount of generated information in the two-frame period does not exceed the capacity of the transmission path. ADRC coding is then performed using the selected set of thresholds.

The assignee of the present application has also proposed a process enabling further compression of the amount of information by combining ADRC of a three-dimensional block and frame-dropping processing (see the specification of Japanese Patent Publication No. 9394/1988). In this process, when the three-dimensional block is a still picture block, an average of the picture elements at corresponding positions in a plurality of areas which form the three-dimensional block is obtained and transmitted, thereby to compress the picture element data of the picture block by a half. An MDT flag indicative of whether frame-dropping processing has been performed is transmitted to the receiver (reproduction) side.

Even in the case of a highly-efficient coding system combining such three-dimensional ADRC and frame-dropping processing, buffering is utilized. As a buffering method of this type, the assignee of the present application has already proposed several methods as disclosed in Japanese Patent Publication Nos. 299587/1989, 299588/1989 and patent application No. 183781/1988 wherein it is taught that the amount of information can be controlled by controlling both the above-mentioned thresholds in the level direction of the dynamic range DR and a threshold determining whether frame-dropping processing should be performed. The threshold for determining whether frame-dropping processing should be performed is called a movement threshold.

An output signal produced by the above-mentioned combination of ADRC and buffering, when recorded, is converted by a frame segmentation circuit into the form of a recording signal whose sync blocks are serial. Further, the reproduced signal is supplied to an ADRC decoder via a frame desegmentation circuit.

In the case of the above-described variable-length ADRC, the bit length of a bit plane which is a coded output of each picture element is determined for each picture block. Bit plane data are stuffed into sync blocks sequentially to form recording data. In the normal reproduction mode where reproduced data are obtained in serial form, the relationship between the reproduced data and the number of the picture block (position of the picture block) for every two frames is determined on the reproduction side. In contrast, in the picture search mode where the tape is driven at a high speed, the head scans some of the tracks simultaneously, and reproduced data are obtained in a discontinuous form for each sync block unit. Therefore, in the picture search mode it is difficult to properly restore the bit planes at the reproduction side and obtain a reproduced picture.

In addition, in the case of the above-indicated variable-length ADRC method including buffering, since the amount of generated data is controlled in predetermined intervals, e.g. in two-frame intervals, the threshold value for controlling the generated data amount is determined for every two frames. Therefore, the threshold code THR may be transmitted once for every two frames. However, when the threshold code becomes erroneous due to an error generated in the recording or reproducing process, the coded data for the two-frame period cannot be decoded.

OBJECTS AND SUMMARY OF THE INVENTION

It is therefore an object of the invention to provide a highly efficient coding apparatus for video data which accords special treatment to a most-significant bit MSB thereof arranged in bit planes and inserts this MSB in a predetermined position in a sync block for transmission, thereby to obtain a reproduced picture from the MSB's in a picture search mode or the like.

Another object of the invention is to provide a highly efficient coding apparatus for video data which can reinforce protection of control data necessary for buffering controls against an error to reliably restore a picture.

According to an aspect of the invention there is provided a highly efficient coding apparatus for coding digital video data in the form of blocks of digital video data representing plural picture elements so as to provide compressed video data for transmission by data transmission means having a predetermined transmission capacity, comprising:

block segmentation means supplied with input video data for generating a series of blocks of digital video data representing plural picture elements, encoding means for encoding the digital video data in each block with a variable digitized bit number determined by characteristics of each block so as to provide coded data of variable bit length, and frame segmentation means for generating a series of sync block data, each of which includes a plurality of blocks of coded data, and at least the most important data portions of the coded data being located in predetermined portions of each sync block.

In one embodiment of the present invention an output signal of an encoder for variable-length ADRC is converted into a sequence of data whose sync blocks are serial. Most significant bits MSB arranged in bit planes of a plurality (e.g. 16) of picture blocks are inserted in predetermined positions in one sync block. Therefore, the system reliably separates and extracts MSB data even in a picture search mode where reproduced data are obtained in each sync block unit, to restore a binary picture by means of the MSB, dynamic range DR and minimum value MIN.

The above, and other, objects, features and advantages of the present invention will become readily apparent from the following detailed description thereof which is to be read in connection with the accompanying drawings.

BRIEF DESCRIPTION OF THE DRAWINGS

FIG. 5 shows the waveforms of timing signals fed to the frame segmentation circuit of FIGS. 4A and 4B;

FIGS. 6 and 7 are schematic diagrams which illustrate the bit planes in greater detail;

FIG. 9 is a guide for arranging FIGS. 9A and 9B for viewing FIGS. 9A and 9B together; and FIGS. 9A and 9B together constitute a block diagram of a frame desegmentation circuit;

FIGS. 13A through 13D are schematic diagrams which provide a comparison between reproduced picture levels in a normal reproducing mode and in the picture search mode;

FIG. 15 is a guide for arranging FIGS. 15A and 15B for viewing FIGS. 15A and 15B together.

FIGS. 15A and 15B together constitute a block diagram of an arrangement of certain reading circuitry of the frame desegmentation circuit;

DETAILED DESCRIPTION OF THE PREFERRED EMBODIMENTS

Figure 1:
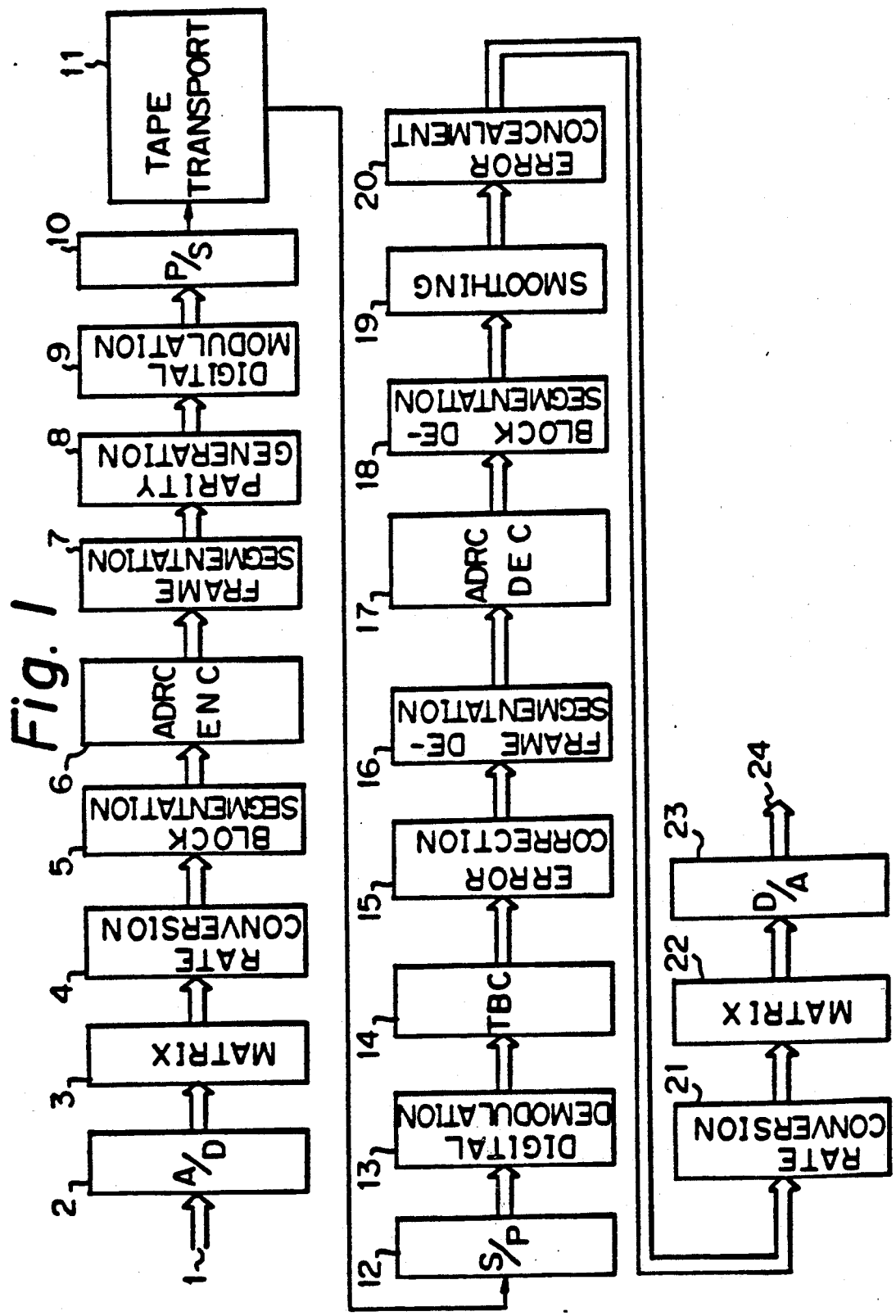
FIG. 1 is a block diagram of a recording and reproducing circuit in accordance with one embodiment of the present invention.

An embodiment of the invention is described in detail below with reference to the drawings. The detailed description is arranged in the following order.

a. Recording Circuit and Reproducing Circuit
b. Input Signals to Frame Segmentation Circuit
c. Output Signals of Frame Segmentation Circuit
d. Arrangement and Operation of Frame Segmentation Circuit
e. Input and Output Signals of Frame Desegmentation Circuit
f. Arrangement and Operation of Frame Desegmentation Circuit
g. Modifications a. Recording Circuit and Reproducing Circuit FIG. 1 shows an arrangement of a recording circuit and a reproducing circuit of a digital VTR in accordance with an embodiment of the present invention. In FIG. 1, three primary-color signals, i.e. red (R), green (G) and blue (B) signals, are supplied to an input terminal shown at 1. An A/D converter shown at 2 converts the three primary-color signals into digital signals. A digital matrix circuit shown at 3 produces a luminance signal (Y) and color-difference signals (U, V). The luminance signal and color-difference signals have sampling frequencies of (Y : U : V) selected as (4 : 4 : 4).

Since digital component signals in a (4 : 4 : 4) format have a large amount of information, they are converted by a rate converting circuit 4 into time-division multiplexed signals having a sampling rate ration of (3 : 1 : 0). More specifically, the sampling frequency of the luminance signal is decreased to ¾ of its former value, the sampling frequency of the color-difference signals is decreased to ¼ of its former value, and the color-difference signals U and V are rearranged as line sequential signals. An output signal of the rate converting circuit 4 is supplied to a block segmentation circuit 5, and signals in the television scanning sequence are converted to signals in a sequence of picture blocks.

Figures 2, 3:
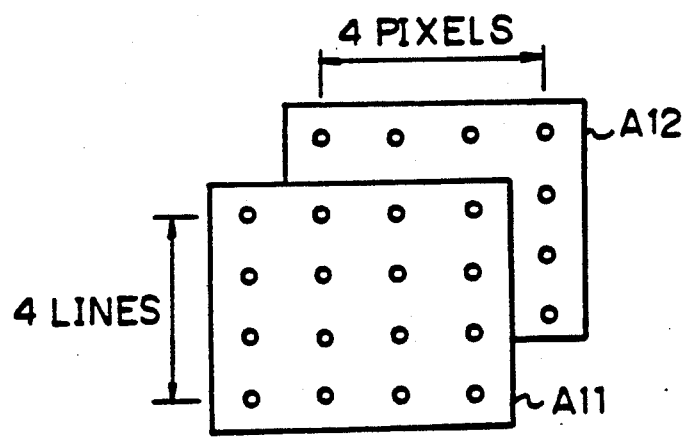
FIGS. 2 and 3 are schematic diagrams used for explaining picture blocks and bit planes.

In this embodiment, as shown in FIG. 2, two areas A11 and A12 which occupy corresponding positions in pictures of two sequential frames each consist of (4 lines×4 picture elements) forming one picture block. In one picture block 32 picture elements are included. In the block segmentation circuit 5, blanking periods in the input signal are removed, and effective data are rearranged into a continuous form. As a result, a data-free period is produced in the sequence of data. One line includes 858 samples of which 720 samples are effective data. One frame includes 525 lines of which 488 lines are effective lines. Therefore, the total number of data and the number of effective data in a two-frame period are as follows:

Number of effective data:
  720×488×2=702,720
Number of data in a two-frame period:
  858×525×2=900,900

The block segmentation circuit 5 consists of a four-frame memory. Only the effective data of the two-frame period are written in a first two-frame memory, and the effective data converted into a sequence of picture blocks are read out of the other two-frame memory. By arranging reading addresses of the two-frame memories in a sequence of picture blocks, the sequence of scanning lines can be converted to a sequence of blocks. Therefore, an output signal of the block segmentation circuit 5 includes 231H data free (where H represents one horizontal period) as follows:

(900,900−702,720)÷858=231$H$

The output signal of the block segmentation circuit 5 is supplied to an ADRC encoder 6. The ADRC encoder 6 detects the maximum value MAX, minimum value MIN and dynamic range DR which is the difference between the maximum and minimum values, performs variable-length coding adapted to the dynamic range DR, and performs frame-dropping processing. For example, four thresholds, T1, T2, T3 and T4 (T4<T3<T2<T1) are established. Where the dynamic range DR of the picture block is (0≦DR<T4), the allotted bit number is 0, and only the maximum value MAX and the minimum value MIN of the picture block are transmitted. Where (T4≦DR<T3), the allotted bit number is 1 bit. Where (T3≦DR<T2), the allotted bit number is 2 bits. Where (T2≦DR<T1), the allotted bit number is 3 bits and where (T1≦DR<255), the allotted bit number is 4 bits. Codes for indicating different threshold sets include a luminance signal threshold code YTHR and a color signal threshold code CTHR.

In this fashion, a buffering process is performed where variable-length ADRC coding using 0 to 4 bits is carried out so that the amount of information in a two-frame period does not exceed a predetermined value. The buffering process consists of a series of steps: obtaining the frequency of occurrence of the dynamic ranges DR in the two-frame period; determining the optimum thresholds T1 to T4 from the frequency distribution of occurrences of dynamic ranges DR; and clearing a memory which stores the frequency of dynamic ranges DR to prepare for subsequent processing. Variable-length ADRC coding is performed, using the thresholds determined by buffering.

The output signal of the block segmentation circuit 5 consists of the effective data of two frames which have been converted into a sequence of picture blocks. The ADRC encoder 6 collects the frequency of dynamic ranges DR during the effective data period, and carries out the steps of establishing a cumulative type frequency distribution table, determining thresholds and clearing the memory in the above-indicated data free period. Subsequently, variable-length ADRC coding is performed, using the determined thresholds.

For still picture blocks, the ADRC encoder 6 generates an average value between two areas A11 and A12 forming a single block, and performs frame dropping processing for coding the average value in lieu of the two areas. As a result of the frame dropping processing, the amount of information of the picture data is compressed by a half for still picture blocks. A movement judging code MDT indicative of whether a block is a still picture block or a moving picture block is formed.

An output signal of the ADRC encoder 6 consists of code signals (called bit planes BPL) corresponding to respective picture elements and additional data. The additional data includes the movement judging code MDT for each picture block, dynamic range DR, minimum value MIN, thresholds YTHR and CTHR of the luminance signal and color-difference signals, the number of the picture block, two-frame discriminating signal DBFR, etc. The number of picture elements in one block is 16 for a still picture and 32 for a moving picture. Therefore, the amount of data of bit planes BPL is a minimum of 0 byte and a maximum of 16 bytes, depending on the bit length, as shown in FIG. 3.

The output signal of the ADRC encoder 6 is fed to a frame segmentation circuit 7 described later, and is converted to a frame arrangement. An output signal of the frame segmentation circuit 7 is supplied to a parity generating circuit 8 where error correction coding in the form of, for example, product codes is effected. An output of the parity generating circuit 8 is supplied to a digital modulation circuit 9 is fed to a parallel-serial converting circuit 10, and a recording signal in the form of serial data is obtained at the output of the parallel-serial converting circuit 10.

The recording signal is supplied to a tape transport 11 in which a magnetic tape contacts a rotary head for recording and reproduction where the signal is recorded on a tape. Further, a reproduced signal which has been reproduced from a tape is supplied to a serial-parallel converting circuit 12 through a reproducing amplifier, etc. This signal is changed to a parallel signal and supplied to a digital demodulating circuit 13 and undergoes digital demodulating processing. An output signal of the digital demodulating circuit 13 is fed to a TBC (time-base correcting device) 14. An output signal of TBC 14 is supplied to an error correction circuit 15, and any error therein is correct with the use of an error correction code. The error correction circuit 15 outputs corrected data and an error flag indicative of the presence or absence of an error.

The output signal of the error correction circuit 15 is fed to a frame desegmentation circuit 16 which is described later. The frame desegmentation circuit 16 separates the bit planes, additional data and error flag, and an output signal of the frame desegmentation circuit 16 is supplied to an ADRC decoder 17. The ADRC decoder 17 decodes the bit planes, using the additional data to obtain reproduced data of 8 bits corresponding to respective picture elements. An output signal of the ADRC decoder 17 is fed to a block desegmentation circuit 18.

The block desegmentation circuit 18, as will be explained later, converts the data of respective picture elements in the order of picture blocks into a signal having the scanning order of a television signal. The block desegmentation circuit 18 outputs picture element data in the form of a coded signal of 8 bits corresponding to respective picture elements, an error flag indicative of the presence or absence of an error in respective picture elements and a movement judging code. The movement judging code is a signal separated from the additional data which indicates whether an outstanding block is a still picture block or a moving picture block. In the case of a still picture block, it is already compressed in the ADRC encoder 6 by frame-dropping processing in which in lieu of two areas A11 and A12 forming a single block, their average value is coded.

An output signal of the block desegmentation circuit 18 is fed to a smoothing circuit 19. The smoothing circuit 19 performs interpolation with respect to the frame-dropped, compressed still picture block, so that one area of data is used for two areas. In addition, smoothing processing is performed to prevent unnatural linkage of the picture between the blocks when the still picture blocks continue. At the output of the smoothing circuit 19 are provided picture element data and an error flag, and these output signals are supplied to an error concealment circuit 20. In the error concealment circuit 20, error data are interpolated with the use of other correct data having a time-wise and spatial correlation.

An output signal of the error concealment circuit 20 is fed to a rate converting circuit 21. The rate converting circuit 21 converts the time-division multiplexed signals of (3 : 1 : 0) into component signals of (4 : 4 : 4). Output signals (luminance signal Y, color-difference signals U, V) of the rate converting circuit 21 are supplied to a digital matrix circuit 22 and are converted to three primary-color signals (R, G, B). The three primary-color signals are converted by a D/A converter 23 into three primary-color analog signals and are extracted at an output terminal 24.

b. Input Signals to Frame Segmentation Circuit

Figures 4, 4A:
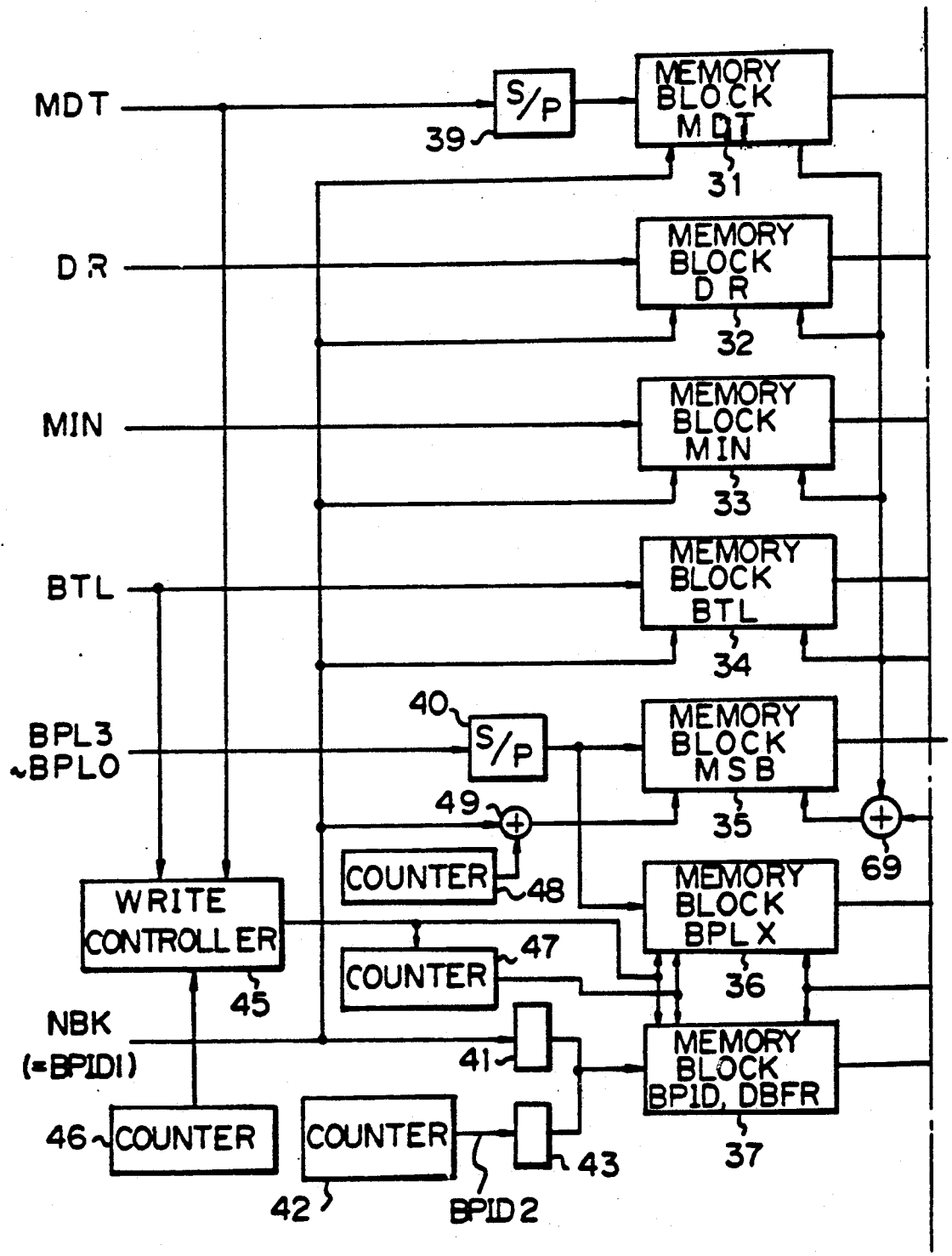
FIG. 4 is a guide for arranging FIGS. 4A and 4B for viewing FIGS. 4A & 4B together.
FIGS. 4A and 4B together constitute a block diagram of a frame segmentation circuit.

FIG. 4 shows the overall arrangement of a frame segmentation circuit. The input signals from the ADRC encoder 6 to the frame segmentation circuit are applied in synchronization with the timing signals shown in FIG. 5. In FIG. 5, FRID refers to a frame ID which is inverted in one-frame intervals, DBFR indicates a two-frame ID which is inverted in two-frame intervals, DTEN represents a data enable signal indicative of effective periods of data, and BLKP refers to a block pulse of one-block intervals. The two-frame ID is represented by the waveform shown by a dash line in the high speed reproducing mode.

YTHR and CTHR: These threshold codes are 5-bit codes which each are set at a value for every two frames as a result of buffering in the ADRC encoder 6. When they are output from the ADRC encoder 6, however, they are attached to respective picture blocks. Note that each picture block of the luminance signal Y is accompanied by YTHR, and each picture block of the color signal C by CTHR.

In the frame segmentation circuit, these threshold codes YTHR and CTHR are dealt with merely as data. In the block desegmentation circuit, however, these threshold codes are used to restore BTL (bit length data) of each picture block as will be explained later. This is because BTL is not transmitted from the frame segmentation circuit to the frame desegmentation circuit.

In the normal reproducing mode, one YTHR and one CTHR both determined for every two frames are used to produce the BTL of all picture blocks in the two frames, and are very important codes.

YCID: This is a 1-bit flag which indicates whether a picture block is a Y signal block or a C signal block.

MDT: This is a 2-bit flag indicative of whether frame-dropping processing has been effected for a picture block. When MDT is (00), it indicates that the picture block is a still block and frame-dropping processing has been effected. When MDT is (11), it indicates that the picture block is a moving block and frame-dropping processing has not been effected. When sampling is also used, MDT is also used as a selection signal of an interpolation filter. The frame segmentation circuit and the frame desegmentation circuit both not only deal with the flag as data but also use it as an input signal of a control-system circuit. More specifically, they use it upon obtaining the number of bytes of effective BPL of respective picture blocks.

DR: This is 8-bit dynamic range data indicative of an amplitude in a picture block. Although the frame segmentation circuit deals with DR simply as data, the frame desegmentation circuit uses it in combination with YTHR and CTHR in order to obtain the bit length of each picture block.

MIN: This is 8-bit data indicative of the minimum value of amplitudes in a picture block.

BPL3 to BPL0: They indicate bit planes and are coding code signals for respective picture elements. They are entered in a 4-bit parallel configuration, regardless of their effectiveness or ineffectiveness. Effective BPL's are determined by MDT and BTL. In FIGS. 6 and 7, hatched-line portions indicate effective BPL for which frame-dropping processing has been done in FIG. 6 but not in FIG. 7.

As shown in FIGS. 6A and 7A, when (BTL=0), there are no effective bits. Each of (4×4×2=32 picture elements) of a picture block has a 4-bit coding code. BPL3 is a set of most significant bits (MSB) of the coding codes, BPL2 is a set of second bits of the coding codes, BPL1 is a set of third bits of the coding codes, and BPL0 is a set of fourth bits, i.e. least significant bits (LSB) of the coding codes. A frame-dropped picture block consists of 16 picture elements.

When (BTL=1), effective data are 16 bits and 32 bits, respectively, as shown in FIGS. 6B and 7B. When (BTL=2), effective data are 32 bits and 64 bits, respectively, as shown in FIGS. 6C and 7C. When (BTL=3), effective data are 48 bits and 96 bits, respectively, as shown in FIGS. 6D and 7D. When (BTL=4), effective data are 64 bits and 128 bits, respectively, as shown in FIGS. 6E and 7E.

BTL: This is bit-length data indicative of the number of effective bits per each picture element. It is determined for every picture block by the dynamic range DR and the threshold codes THR of the picture block. It represents a value from 0 to 3.

BKAD: This indicates a serial number of a picture block.

c. Output Signals of Frame Segmentation Circuit

The frame segmentation circuit outputs a sequence of data bytes DT whose sync blocks are serial, reserving an overhead region so that an overhead can readily be attached in a later stage. The data byte sequence DT not only includes picture effective codes (MDT, DR, MIN and effective BPL) but also includes YTHR, CTHR, DBFR and BPID which are added one by one to each sync block. These additional codes are important as supplemental means for operating the frame desegmentation circuit. Moreover, FRID and SYNP (sync pulse) are outputted as timing control signals. SYNP is a synchronizing signal of a sync block in the circuit, and FRID in the output side synchronizes with SYNP.

Referring to FIG. 8, an explanation is provided regarding arrangements of codes. In a 2-frame period defined by the timing signal FRID shown in FIG. 8A are included 8 segments as shown in FIG. 8B. One segment includes (184+12=196) individual sync blocks which synchronize with the sync pulse SYNP (FIG. 8C). 184 sync blocks are effective sync blocks including picture code areas and additional code areas, and 12 subsequent sync blocks are ineffective sync blocks including error correcting code parities. One sync block has a length of 156 bytes, and the data of 16 picture blocks are inserted in one sync block.

Figures 8E, 8G:
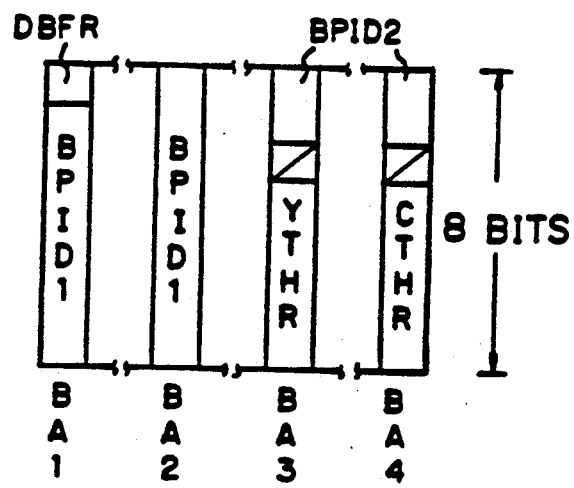
FIG. 8 is a schematic diagram used for illustrating output signals of the frame segmentation circuit.

First to seventh segments in one period of the timing signal FRID have data arrangements shown in FIG. 8D, respectively, and the eighth segment has the data arrangement shown in FIG. 8E. Sync blocks are distinguished as A type, B1 type and B2 type, depending on their data arrangements. B1 type is in the majority. (4×46=184) effective sync blocks of the first to seventh segments consist of five A-type sync blocks at the beginning, five A-type sync blocks at the end and 174 B1 type sync blocks between them. PTO represents an error correcting code parity regarding data aligned in a horizontal direction, and PT2 is a parity regarding data aligned in a vertical direction. Effective sync blocks in the eighth segment consist of A-type sync blocks located at the beginning and the end, respectively, and B1-type and B2-type sync blocks located between them.

Figures 8F, 8H, 8I:
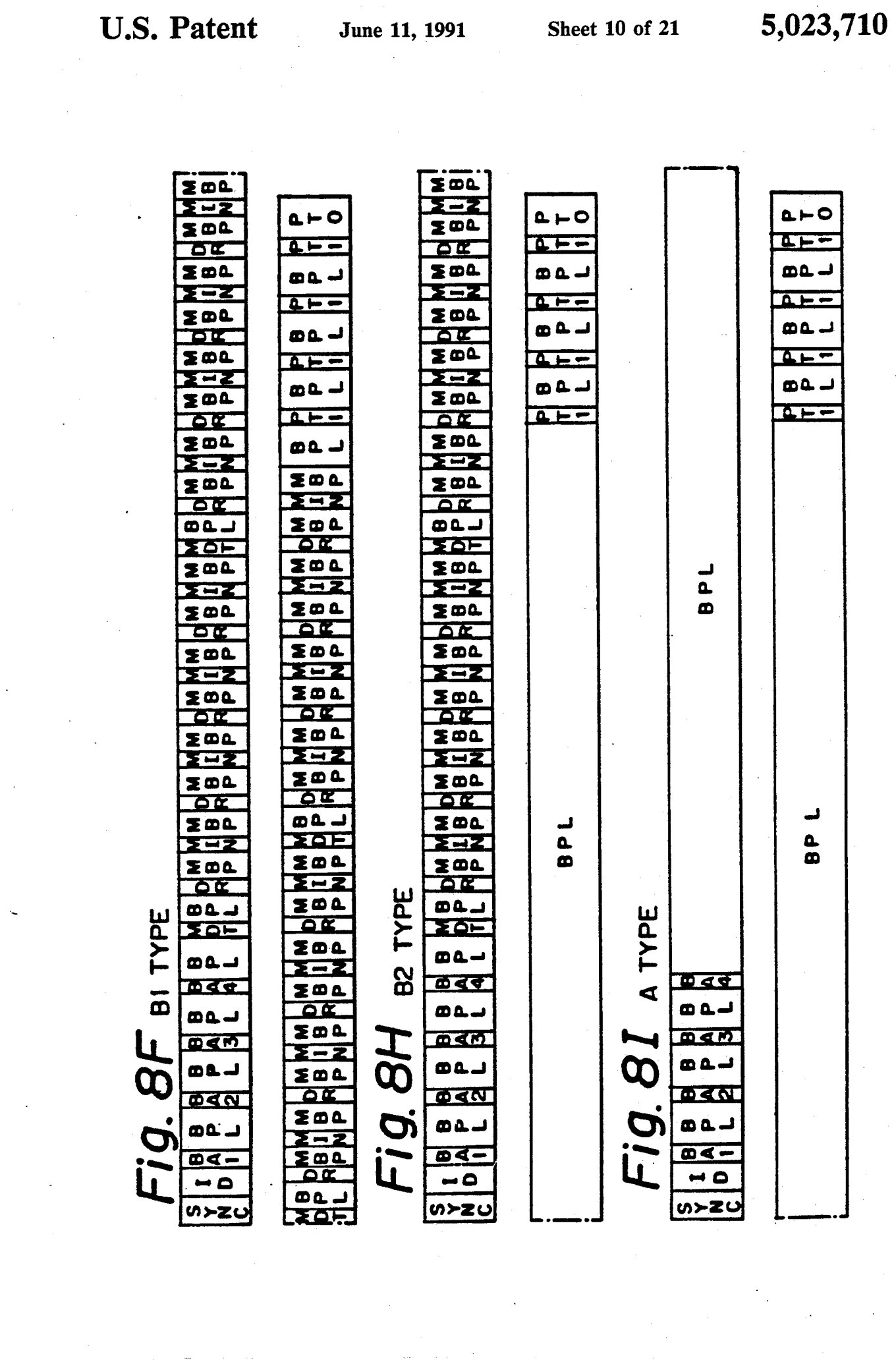

FIG. 8F shows a data arrangement of a B1-type sync block, FIG. 8H shows a data arrangement of a B2-type sync block, and FIG. 8I shows a data arrangement of an A-type sync block. Each sync block has a sync pattern (SYNC) and an ID at the head thereof. ID's are serial numbers (sync block numbers) assigned to (8×196=1568) sync blocks contained in a 2-frame period. The head portion of a sync block subsequent to ID is shown in an enlarged scale in FIG. 8G.

A rule governing the code arrangement of a sync block is explained below. The portion of a sync block except for the overhead portion for addition of the error correcting code parity is divided into a picture code area and an additional code area. The picture code are includes MDT, DR, MIN and BPL whereas the additional code area includes DBFR, YTHR, CTHR and BPID. The additional code area is located near the head of the sync block, regardless of the type, and has an arrangement shown in FIG. 8G.

Among the outputs of the ADRC encoder, MDT, DR and MIN, as important words, are disposed at predetermined positions in the picture code area. As shown in FIG. 8F and 8H, respective DR and MIN of four picture blocks are located after MDT of four picture blocks (one byte in total). These MDT, DR and MIN are located in three-byte intervals. One effective sync block includes MDT, DR and MIN for 16 picture blocks. YTHR, CTHR and BPID are additional important words. A parity is particularly added to these important words to reduce the influence of an error. PT1 is an error correcting code parity for the important words.

In the other portions of the picture code area excluding the portions occupied by the important words are positioned bit planes BPL. Of the BPL data, BPL (MSB) is dealt with in a particular way. When effective MSB is present in a picture block, MSB is located in a predetermined position near MDT, DR and MIN in the same picture block referred to as an MBP slot. In this example, two bytes subsequent to each of DR and MIN are used as MBP slots. No particular parity is added to MSB.

The picture code areas not occupied by the important words and MSB are stuffed in sequence with effective BPL's except MSB (generally referred to as BPLX) throughout the two frames.

In FIG. 8G, BPID is an ID signal of the first BPLX in the sync block. BPIDI of 15 bits indicates the number of the picture block in the two frames to which this BPLX belongs, and BPID2 indicates the number assigned to each byte in the picture block (sub-block number). The first byte of the additional code area is shown as BA1, and the second, third and fourth bytes by BA2, BA3, and BA4, respectively. The data arrangements of the additional code area are identical for the A-type, B1-type, and B2-type sync blocks. The A-type effective sync block shown in FIG. 8I does not include MDT, DR and MIN whereas the B1-type sync block shown in FIG. 8F includes MDT, DR and MIN. By adjusting the number of effective sync blocks of these two types, useless MDT, DR and MIN slots with no entry of effective codes are reduced. Further, it is easy to completely remove useless MDT, DR and MIN by also entering the effective B2-type sync block partly having MDT, DR and MIN slots (shown in FIG. 8H).

d. Arrangement and Operation of Frame Segmentation Circuit

Figure 4B:
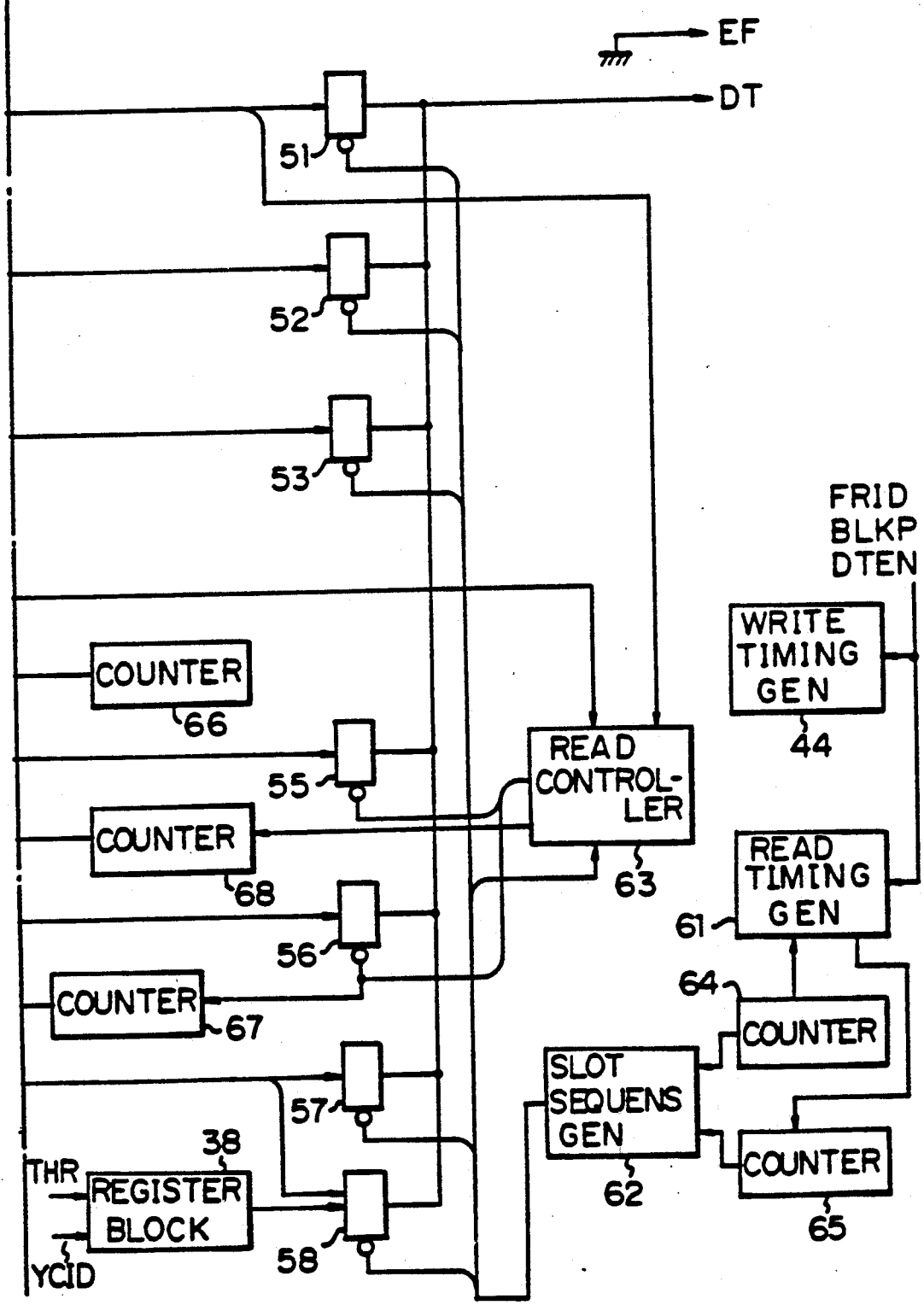

Referring to FIGS. 4A and 4B, the frame segmentation circuit 7 is explained. The frame segmentation circuit 7 has a memory arrangement which consists of memory blocks 31 to 37 for respective codes and a register block 38. The memory blocks 31 through 37 have a double-bank arrangement consisting of two memories so that in a two-frame period when data is written in one of the memories, data of a two-frame period are read out of the other memory.

The memory block 31 is used for the movement detection flag MDT. 2-bit MDT data is converted by a serial-parallel converting circuit 39 into 8-bit parallel data and is fed to the memory block 31.

The memory block 32 is used for the dynamic range DR, and an 8-bit DR is fed to the memory block 32.

The memory block 33 is used for the minimum value MIN of a picture block, and an 8-bit MIN is fed to the memory block 33.

The memory block 34 is used for the bit-length data BTL, and a 3-bit BTL indicative of the bit length of (0 to 4) bits is fed to the memory block 34

The memory blocks 35 and 36 are used for bit planes BPL. 4-bit parallel BPL's are converted by a serial-parallel converting circuit 40 into 8-bit parallel data. The serial-parallel converting circuit 40 converts each of BPL3 (i.e., MSB), BPL2, BPL1 and BPL0 into 8-bit parallel data. In this embodiment where one picture block consists of 32 picture elements, the bit plane includes a data amount of (4 bits×32) (see FIG. 7E). The 32 picture elements are divided into four equal parts each including 8 picture elements. The 8 picture elements of each bit plane are converted by the serial-parallel converting circuit 40 into 1-byte parallel data. That is, the serial-parallel converting circuit 40 sequentially produces one byte of BPL3 (MSB), one byte of BPL2, one byte of BPL1 and one byte of BPL0, and this 4-byte arrangement is repeated four times. BPID2 is a block interior number indicative of the order of 16 bytes in one picture block. Among the output signals of the serial-parallel converting circuit 40, MSB is fed to the memory block 35, and the other bit planes BPLX are supplied to the memory block 36.

The memory block 37 is used for BPID1, BPID2 and DBFR (see FIG. 8G). BPID1 is fed to the memory block 37 via a register 41, and BPID2 formed by a counter 42 is fed to the memory block 37 via a register 43.

The register block 38 is supplied with a threshold code THR and a YC discriminating signal YCID.

In one of the memory banks of each memory block 31 to 37 is written an input signal for a two-frame period, the memory blocks 31 to 37 are read out in a subsequent two-frame period, and the data byte sequence DT shown in FIG. 8 is output.

In order to control the writing function, there are provided a write timing generating circuit 44 forming major write timing signals from input timing signals FRID, BLKP and DTEN, a write control circuit 45 for writing effective bit planes in the memories, a picture block period counter 46, a BPLX writing counter 47 and an MSB writing lower address counter 48.

BPID1 (NBK) indicative of the picture block number is used as a writing address of the memory blocks 31, 32, 33 and 34, and is also fed to an adding circuit 49 to be added to a lower address generated in the MSB writing lower address counter 48. An output of the adding circuit 49 is used as a writing address of the memory block 35.

At the output sides of the memory blocks 31, 32, 33, 35, 36 and 37 and the register block 38 are provided respective register 51, 52, 53, 55, 56, 57 and 58 each having an output control function. Data are read out of the registers in a controlled order, and the data byte sequence DT is formed. The error flag EF has a value ("0") indicative of the absence of an error.

In order to control the reading side, there are provided a read timing generating circuit 61 for forming major read timing signals from input timing signals FRID, BLKP and DTEN, a slot sequence generating circuit 62, a read control circuit 63 for controlling the reading of MSB and effective BPLX, a sync block period counter 64, a sync block counter 65, a reading picture block counter 66, a BPLX reading counter 67 and an MSB reading lower address counter 68.

An output signal of the picture block counter 66, as a reading address, is fed to the memory blocks 31, 32, 33 and 34, and is also fed to an adding circuit 69 to be added to a lower address formed in the MSB reading lower address counter 68. An output signal of the adding circuit 69 is fed to the memory block 35 for use as a reading address.

An output signal of the slot sequence generating circuit 62 controls the timing for extracting outputs from the registers 51, 52, 53, 57 and 58. The read control circuit 63 is supplied with MDT from the memory block 31, BTL from the memory block 34 and the output signal from the slot sequence generating circuit 62. An output signal of the read control circuit 63 is fed to the MSB reading lower address counter 68 and the BPLX reading counter 67, and the registers 55 and 56 are controlled by the output signal of the read control circuit 63.

Next, an explanation of the writing and reading operations of the respective codes in the above-described frame segmentation circuit 7 is provided.

The threshold codes THR are written in a YTHR register and in a CTHR register in the register block 38 in a data writing period (two frames) in accordance with YCID. These THR's are held until the writing period terminates, and they are outputted in the YTHR and CTHR slots in effective sync blocks in the subsequent two-frame period.

MDT, DR, MIN and BTL, for use as writing addresses of picture block numbers, are written in respective own-use memories. Since each MDT has two bits for each picture block, the MDT data of four picture blocks are combined in the serial-parallel converting circuit 39 before they are written in the memory block 31. During the reading period, all of the DR and MIN data and one MDT byte for four picture blocks are output to slots of predetermined timing in the sequence of the picture blocks. Although BTL is read out of the memory concurrently with DR, MIN and MDT, it is not output in the data byte sequence DT but rather is output to the read control circuit 63 to be used for judgement of the MBP slot.

MSB (BPL3), similarly to the other bit planes, is converted to a byte sequence in the serial-parallel converting circuit 40. Four bytes of MSB data per picture block are written in the memory block 35 regardless of its effectiveness or ineffectiveness. The upper portion of the writing address indicates the picture block number, and the lower portion thereof indicates the block interior number. The MSB slot is located near the DR and MIN slots and four MSB slots per picture block are provided.

During the reading period, if effective MSB is present in the picture block, it is entered in the MBP slot. Judgement of the MBP slot is done by the read control circuit 63 based on MDT and BTL. Let MBP slots of a picture block be designated MBP1, MBP2, MBP3 and MBP4 in sequence. Then the relationship between the kind of codes to be entered in these MBP slots and (MDT, BTL) is as follows:

| MDT | BTL | MBP1 | MBP2 | MBP3 | MBP4 |
| --- | --- | --- | --- | --- | --- |
| 0 | 0 | BPL | BPL | BPL | BPL |
| 0 | 1 | MSB | MSB | BPL | BPL |
| 0 | 2 | MSB | MSB | BPL | BPL |

-continued

| MDT | BTL | MBP1 | MBP2 | MBP3 | MBP4 |
|---|---|---|---|---|---|
| 0 | 3 | MSB | MSB | BPL | BPL |
| 0 | 4 | MSB | MSB | BPL | BPL |
| 1 | 0 | BPL | BPL | BPL | BPL |
| 1 | 1 | MSB | MSB | MSB | MSB |
| 1 | 2 | MSB | MSB | MSB | MSB |
| 1 | 3 | MSB | MSB | MSB | MSB |
| 1 | 4 | MSB | MSB | MSB | MSB |

Although the bit planes BPLX excluding MSB include 12 bytes per picture block, only the effective ones among them are written in addresses of the memory block 36 which are serial from 0. Discrimination of effective BPLX is performed by the write control circuit 45 based on MDT and BTL. The relationship between (MDT, BTL) and effective BPLX is shown in FIGS. 6 and 7. Since BPID is related to BPLX by 1:1, it is written in the same address as that of BPLX. However, BPID outputted as the data byte sequence DT follows the head-coming BPLX alone of an effective sync block.

During the reading period, effective BPLX are outputted in sequence in two kinds of slots not occupied by MSB and the BPL slot among the MBP slots. BPID which is the first outputted BPLX of the effective sync blocks is read out of the memory block 37 together with BPLX at the head of the effective sync block, and it is latched in the registers 57 and 58 so as to be output to the data byte sequence DT on arrival of the BPID slot.

The picture block number corresponding to the position of a picture block in two frames consists of 15 bits, and it is inputted in the form of 2 bytes from the ADRC encoder 6. DBFR whose value is inverted every two frames is entered in a vacant bit contained in the two bytes. The picture block number is used as BPID1 (see FIG. 8G), and DBFR is also dealt with at the same time.

e. Input and Output signals of Frame Desegmentation Circuit

Figure 9B:
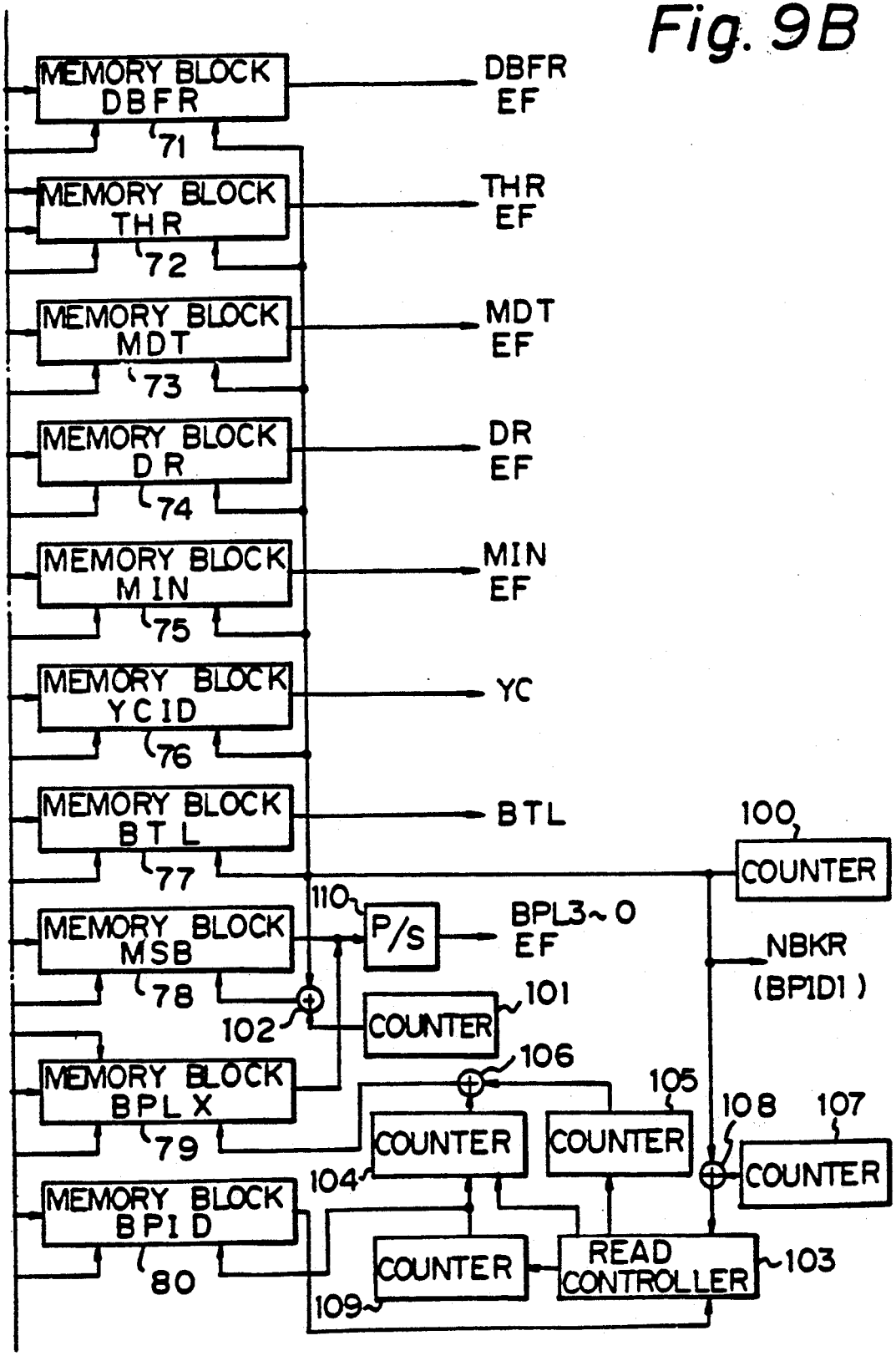

FIGS. 9A and 9B together illustrate an arrangement of frame desegmentation circuit 16. Since a reproduced signal is inputted to the frame desegmentation circuit 16, the input signal to the frame desegmentation circuit corresponds with the data byte sequence DT output from the frame segmentation circuit 7. However, when an error occurs during the recording and reproducing process, the error flag EF represents a high level at the data byte including the error. During the picture search mode where the tape speed is high and the magnetic head scans the magnetic tape across a plurality of segments thereof, the data bytes contained in two different frame periods are divided into small parts and entered in the frame desegmentation circuit 16.

An output signal of the frame desegmentation circuit 16 is identical to the output signal of the ADRC encoder 6 when no error is present. However, since the input data byte sequence includes an error even in the normal reproducing mode, it is affected by the error. A propagation error occurs in BPLX which are bit planes excluding MSB. Since YTHR, CTHR and DBFR pass through a majority block, such error becomes negligibly small.

In the picture search mode, the signal represents an aspect extending over two frames. Therefore, BPID is invalidated, and proper restoration of BPLX is impossible. As a result, BPLX is not output, and DR, MIN and effective MSB alone are outputted as effective data. In this case, a reproduced picture in which each picture block is reproduced as a binary picture is obtained. The reproduced picture has a degraded amplitude resolution as compared to that in the normal reproducing mode. However, its spatial resolution is not deteriorated, and the contents of the picture can be discriminated to a certain extent which is acceptable as a reproduced picture in the picture search mode.

f. Arrangement and Operation of Frame Desegmentation Circuit

The frame desegmentation circuit shown in FIGS. 9A and 9B generally consists of a prepositional part and a major part. The prepositional part includes majority blocks 81 and 83, FIFO memories 82, 84 and 85, and a phase adjusting delay circuit 86. The majority block 81 and the FIFO memory 82 are used for DBFR, the majority block 83 for THR, the FIFO memory 84 for YTHR, and the FIFO memory 85 for CTHR.

The major part includes memory blocks 71 through 80 for specific use in storing respective codes. They have the same double-bank arrangement as those in the frame segmentation circuit. Reference numeral 71 denotes a memory block for 1-bit DBFR from the FIFO memory 82. 72 designates a memory block for YTHR and CTHR (each of 1 byte) from the FIFO memories 84 and 85. 73 refers to a memory block for 2-bit MDT through the delay circuit 86 and a parallel-serial converting circuit 87. 74 and 75 refer to memory block for DR and MIN through the delay circuit 86, respectively. 78, 79 and 80 denote memory blocks for MSB, BPLX and BPID through the delay circuit 86. 76 designates a memory block for YCID from a YC ROM 89. The YC ROM 89 is supplied with an address signal generated in a writing-side picture block number counter 88. 77 refers to a BTL memory block in which BTL from a BTL reproducing circuit 90 is written.

The seven memory blocks 71 to 77 receive picture block numbers as their addresses. Writing addresses corresponding to picture blocks generated in the writing-side picture block counter 88 are supplied to the memory blocks 71 through 77. Reading addresses generated in a reading-side picture block counter 100 are fed to the memory blocks 71 to 77.

A lower address generated in an MSB counter 91 in the writing-side picture block is added to the picture block number (upper address) by an adding circuit 92, and an output of the adding circuit 92 is fed to the memory block 78 for use as a writing address. Similarly in the reading side, a lower address generated in an MSB number counter 101 in the reading-side picture block is added to a picture block number NBKR (upper address) by an adding circuit 102, and an output of the adding circuit 102 is fed to the memory block 78 for use as a reading address.

The memory block 79 takes the upper address as an effective sync block number, and takes the lower address as an effective sync block interior number. An output signal of an effective sync block number counter shown at 94 is fed to an adding circuit 96, and is added therein to an output signal of a block interior number counter 95. An output signal of adding circuit 96 is supplied to the memory block 79 for use as a writing address. A BPLX write control circuit 93 is provided in association with the memory block 79. A reading address made by a BPLX read control circuit shown at 103, BPLX reading counters 104 (upper) and 105 (lower) and an adding circuit 106 is fed to the memory block 79 for use as a reading address. The read control circuit 103 is supplied with output signals of the block number counter 100 and a block period counter 107 which have been added by an adding circuit 108.

In the aforementioned frame segmentation circuit, BPID is attached to all BPLX from the ADRC encoder. However, the data byte sequence DT entered in the frame desegmentation circuit includes a single BPID alone attached to an effective sync block. The BPID indicates the number of the picture block to which the first BPLX of the sync block belongs and the number in the interior of the picture block. Therefore, the memory block 80 is supplied with the number of the effective sync block from the counter 94 as a writing address. Similarly, an output signal of a BPID reading counter 109 is fed to the memory block 80 as a reading address. BPID which has been read is fed to the read control circuit 103.

MSB and BPLX which have been read out of the memory blocks 78 and 79, respectively, are supplied to a parallel-serial converting circuit 110, and bit planes BPL3 to BPL0 are extracted from the parallel-serial converting circuit 110.

Further, there is provided a write timing generating circuit 97 which is supplied with a timing signal FRID, a sync pulse SYNP and a signal CDEN indicative of data effective periods to generate major timing for the writing side. Moreover, there is provided a read timing generating circuit 98 which generates major timing signals for the reading side, timing signals FRID, BLKP and a signal DTEN indicative of a data effective period.

The memory blocks 71 through 80 each have two memory banks as in the frame segmentation circuit, and data which are entered in a two-frame period are written once in the memory blocks for each kind of codes, and are read out in sequence in the subsequent two-frame period.

Next an explanation is provided regarding how important words are dealt with in the entered data. Important words (MDT, DR, MIN, YCID, BTL, DBFR and THR) are written in the memory blocks 71 to 77 for use as an address for writing a picture block number. All the words commonly use the writing address and writing pulse The flag MDT indicative of movement is desegmented by the parallel-serial converting circuit 87 in one-picture units before it is written in the memory block 73. Although not shown in FIGS. 9A and 9B, dynamic range DR and MDT are also fed to the BTL reproducing circuit 90. The BTL reproducing circuit 90 decodes BTL data indicative of the bit lengths of bit planes for each picture block from DR and MDT.

The YC ROM 89 reproduces YCID from the picture block number received from the counter 88. The thresholds THR of each picture block consist of YTHR and CTHR selected by YCID.

Important words written in the memory blocks 71 through 77 are read out in the subsequent two-frame period with the same timing as the output signal of the ADRC encoder 6, using the picture block number as a reading address. Since the important words have a particularly reinforced error correcting ability, no propagation error is reproduced.

The following explanation is directed to the manner of processing in the majority blocks 81 and 83 provided in the prepositional part of the frame desegmentation circuit. The processing of the threshold THR is first explained. THR is not only dealt with as data but also used to reproduce the bit length data BTL in the frame desegmentation circuit. Further, THR is outputted with each picture block from the frame desegmentation circuit, and an ADRC decoder can also obtain BTL on review of THR. However, since the memory block 77 produces BTL restored by the BTL reproducing circuit 90, attaching it to each picture block, the frame desegmentation circuit need not output THR.

Figure 10:
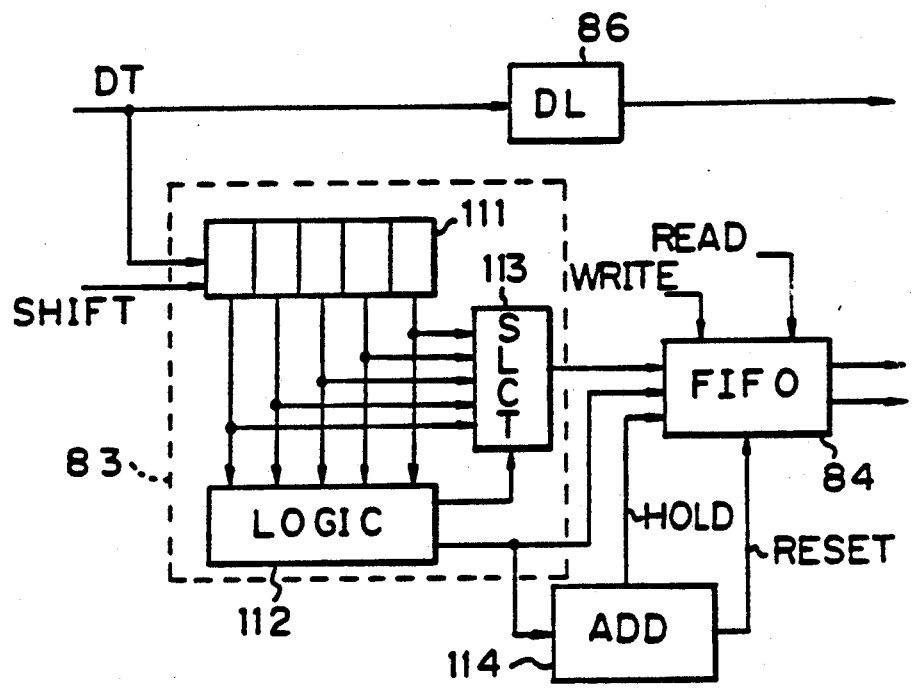
FIG. 10 is a circuit block diagram including a majority block.

In FIG. 10, the arrangement encircled by a dash line is the majority block 83. The majority block 83 consists of a shift register 111, a logic circuit 112 and a selector 113. The shift register 111 is supplied with the data byte sequence DT and performs a shifting operation using a shift pulse. The shift register 111 sequentially picks up the threshold data THR inserted in each sync block. Five serial THR's from the shift register 111 are supplied to the logic circuit 112 for determining whether all five THR's coincide. The selector 113 is controlled by an output signal of the logic circuit 112 to select the THR located in the center of the shift register 111 when coincidence is acknowledged. The logic circuit 112 generates an error flag EF which represents a low level upon coincidence of all the THR's and represents a high level upon any disaccord among them.

The THR selected by the selector 113 and EF from the logic circuit 112 are fed to the FIFO memory 84. An adding circuit shown at 114 is provided, and EF is supplied to the adding circuit 114. The adding circuit 114 forms a hold signal and a reset signal for the FIFO memory 84. The FIFO memory 84 is precedingly supplied with a write signal and a read signal.

Figure 11A:
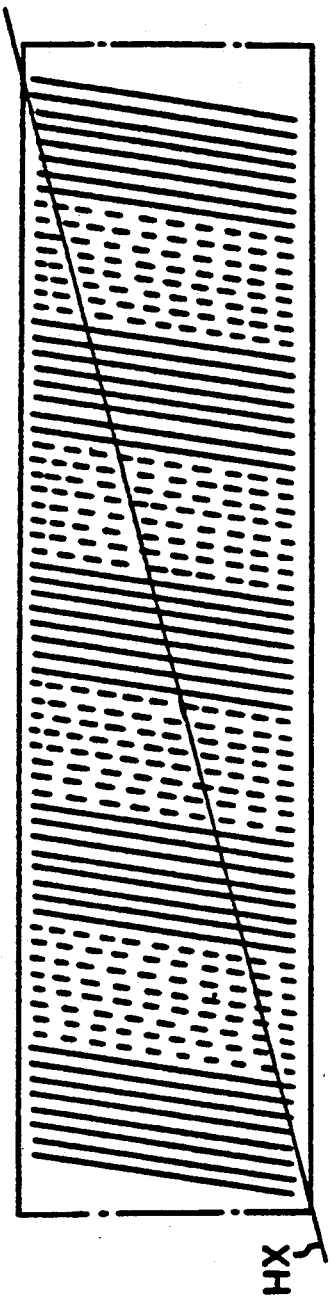
FIG. 11 is a schematic diagram used for explaining certain aspects of operating in a picture search mode.

In the picture search mode, the head scans a tape across a plurality of segments (tracks) as shown by an arrow HX in FIG. 11A. In this example, recording signals of two frames are recorded in 8 segments, and FIG. 11 numbers such two frame periods as n, n+1, n+2, n+3, et seq.. Therefore, as shown in FIG. 11B, DBFR which is configured to invert every two frames and THR, data for every two frame period are generated.

Figure 11C:
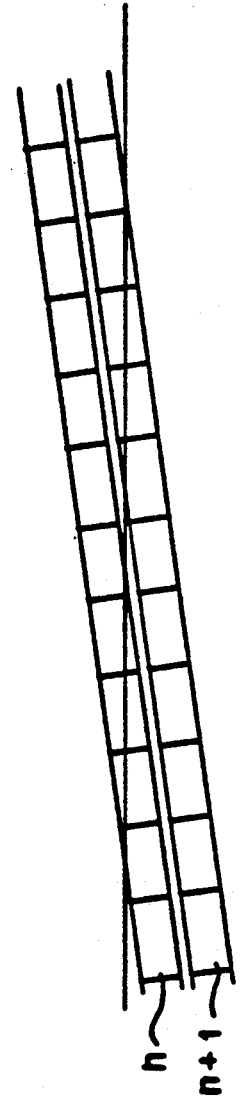

FIG. 11C shows in an enlarged scale a portion where the head scanning orbit moves from a segment having data of an n-th two-frame period recorded thereon to a segment having data of an (n+1)-th two-frame period recorded thereon. FIG. 11D shows a sync pulse SYNP synchronizing with reproduced data. FIG. 11E shows reproduced THR, majority-processed THR and error flag EF. Reproduced THR is obtained in every effective sync block, but it is not obtained when the head scans the border between two segments. When five serial reproduced THR's obtained from an effective sync block coincide, the majority block 83 shown in FIG. 10 deems this THR to be a true value. This majority decision is performed for each effective sync block. Therefore, the THR which has been deemed to be the true value is generated as shown in FIG. 11E.

A flag DBFR indicative of the even or odd number of a two-frame period is supplied to the majority block 81 and undergoes the same type of processing as THR. FIG. 11F shows reproduced DBFR, majority-processed DBFR and error flag EF.

The THR which has been admitted as the true value by the majority block 83 is written once in the FIFO memory 84. YTHR and CTHR, although omitted in FIG. 10 only for simplification purposes, are written in different FIFO memories 84 and 85, respectively, and read out of the FIFO memory 84 coincidentally with a signal delayed by the delay circuit 86.

In the normal reproducing mode, by referring to the error flag EF whenever a majority decision is effected and whenever effective sync blocks whose THR are fixed continue, for example, four times, the adding circuit 114 decides the value of THR obtained for the last effective sync block to be the threshold data regarding data of the two-frame period. The time necessary for establishing THR induces a phase difference and, accordingly other data in the data byte sequence DT are delayed appropriately by the delay circuit 86.

In the normal reproducing mode, the adding circuit 114 not only resets the FIFO memory 84 at the head of the two-frame period but also again resets the FIFO memory 84 and causes the hold signal to be a high level when the error flag EF outputted from the majority block 83 represents a low level four times in sequence, for example. Just after this, THR is written in the FIFO memory 84. Therefore, when the adding circuit 114 judges that THR is fixed, the established THR, EF (low level), and hold signal (high level) are written in the head address of the FIFO memory 84.

In the picture search mode, the adding circuit 114 resets the FIFO memory 84 only at the head of a two-frame period as explained above, and maintains the hold signal in a low level, so that majority judgement is performed for each effective sync block.

DBFR is fed to the majority block 81 in the same manner as the aforementioned THR and undergoes majority judgement processing. Since DBFR is not used in the control system in the input (writing) period, it may be established later than the other data, unlike THR.

Figure 12:
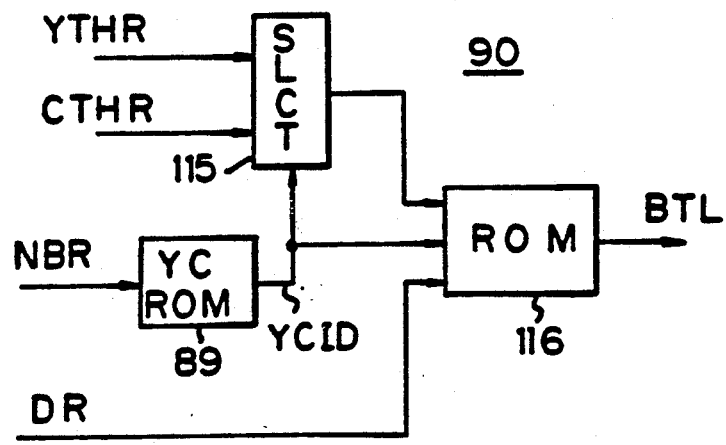
FIG. 12 is a block diagram of a BTL reproducing circuit.

FIG. 12 shows an example of the circuit 90 for reproducing the bit length data BTL. YC ROM 89 is supplied with a picture block number NBR as an address, and it reproduces YCID. YTHR and CTHR are fed to a selector 115, and the selector 115 is controlled by YCID. An output of the selector 115, YCID and DR (dynamic range data) are supplied to a ROM 116 for use as addresses. The ROM 116 decodes the bit lengths BTL of the bit planes of each picture block. YCID and BTL are used for control on the writing side and for control on the reading side. In this connection, memory blocks 76 and 77 for YCID and BTL are provided. The read timing of the memory blocks 76 and 77 is common with the other memory blocks.

MSB processing is explained below. MSB is a kind of bit plane but is dealt with independently of the other bit planes. MSB is dealt with as an effective code in both the normal reproducing mode and the picture search mode. In the normal reproducing mode, the other BPL can also be outputted, and a complete reproduced picture is restored. However, in the picture search mode where reproduced data are obtained in the form of fragments of each sync block unit, the other BPL cannot be outputted, and a reproduced picture is restored from codes other than BPLX. That is, a restored picture in the picture search mode is a binary picture obtained from (MIN, DR and MSB) for every block.

FIG. 13 provides a comparison between the amplitude levels of restored pictures in the normal reproducing mode and in the picture search mode. FIG. 13A shows the case in which (BTL=1) where an identical restoration level is obtained in the normal reproduction mode and in the picture search mode. FIG. 13B shows the case in which (BTL=2) where data of picture elements, although restored in four levels in the normal reproduction mode, are restored in two levels in the picture search mode. FIGS. 13C and 13D show cases in which (BTL=3) and (BTL=4), respectively, where picture elements although restored in 8 or 16 levels in the normal reproducing mode, are restored in only two levels in the picture search mode.

MSB is included in MBP slots when the BTL of a picture block is 1 or more. The frame desegmentation circuit unconditionally writes the data of the MBP slot in the memory block 78, using the picture block number and the picture block interior number as writing addresses, regardless of the presence or absence of MSB in the MBP slot. Upon reading the data in the normal reproducing mode, MSB is outputted only when it is judged from BTL and MDT that effective MSB is present. In the picture search mode, since BPLX is lacking, MSB is outputted in lieu of BPLX also to those portions to be supplied with an effective BPLX, as shown below.

| Input MSB | Output | (MSB, | BPL2, | BPL1, | BPL0) |
|---|---|---|---|---|---|
| Level 1 | 0 | (0, | 0, | 0, | 0) |
| Level 2 | 1 | (1, | 1, | 1, | 1) |

Processing of BPLX is explained below. The first explanation is directed to an error-free case.

BPLX is inserted in a part of the MBP slots and BPL slots. The frame desegmentation circuit picks up BPLX from the input data byte sequence DT, and after once writing it in the memory block 79, subsequently reads out it together with important words, MSB, etc. in the reading period at an accorded timing.

Figure 14:
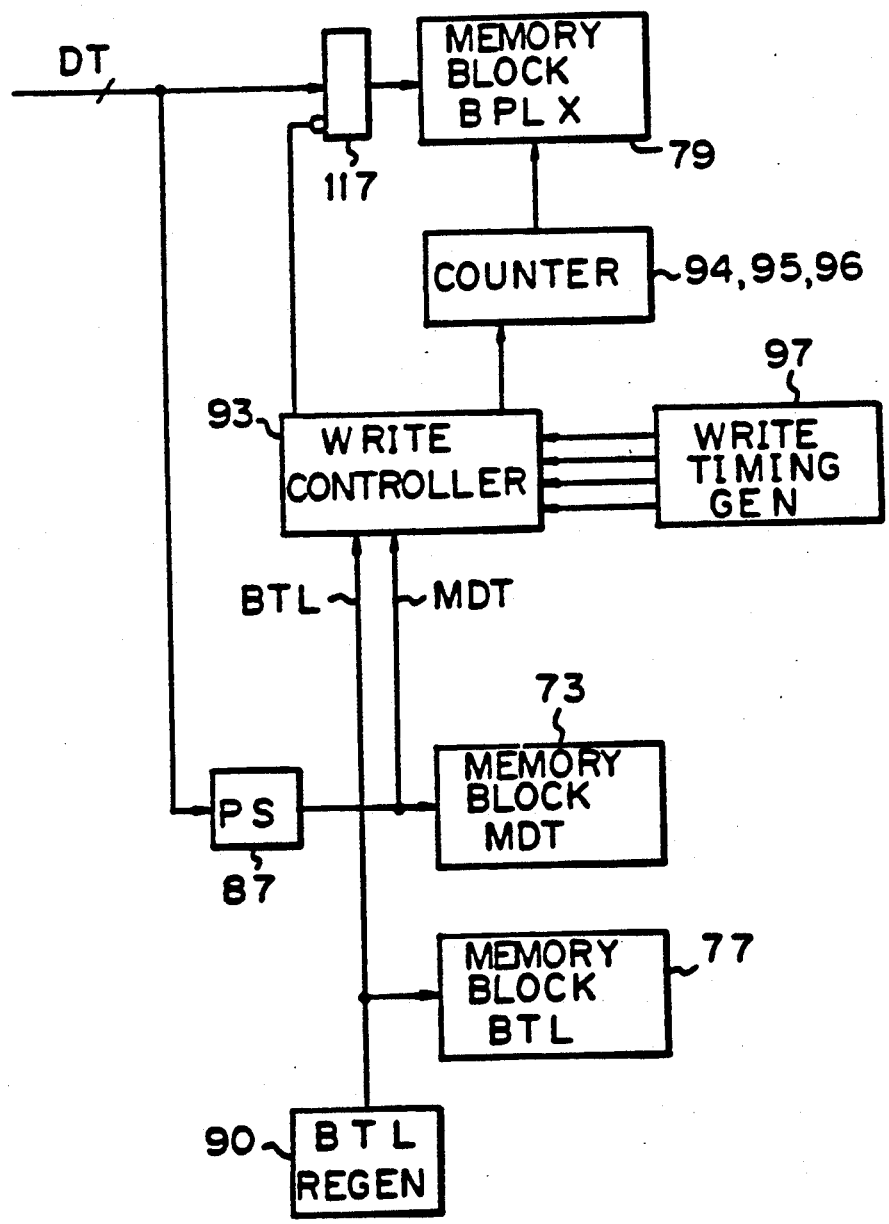
FIG. 14 is a block diagram of an arrangement of certain writing circuitry of the frame desegmentation circuit.

FIG. 14 shows an arrangement of the BPLX writing circuitry. The data byte sequence DT is fed to the memory block 79 via a register 117. The register supplies the data to the memory block 79 in response to a control signal from the write control circuit 93. The write control circuit 93 is supplied with a timing signal indicative of the MBP slot from the write timing generating circuit 97.

The write control circuit 93 detects the position of BPLX from the input byte sequence DT, and takes it into the I/0 bus of the memory block 79. Since BPLX is always present in any BPL slot, the circuit 93 never fails to accept such a code. Whether the code present in the MBP slot is MSB or BPLX depends on the picture. In order to judge it, the write control circuit 93 is supplied with MDT from the parallel-serial converting circuit 87 and BTL from the BTL reproducing circuit 90. The write control circuit 93 identifies a slot having BPLX, based on MDT, BTL and signals from the write timing generating circuit to indicate the timing of BPL and MBP slots. Timing signals corresponding to respective 4-byte MBP slots attached to each picture block and a timing signal corresponding to a BPL slot are generated by the write timing generating circuit 97.

Writing of BPLX follows a writing address wherein the number of an effective sync block generated in the counter 94 comprises the upper address and numbers attached sequentially from zero in effective sync blocks generated in the counter 95 comprise the lower address. Since the presence or absence of BPLX in the MBP slot depends on the corresponding picture block, the number of bytes of BPLX per effective sync block varies by the number of bytes of BPLX present in one effective sync block. Also, there are sync blocks in which no MDT, DR, MIN, or MBP slot is present (A-type shown in FIG. 8I). Therefore, the number of bytes of BPLX per effective sync block in general becomes variable. In order to sequentially read out, in the output period, of the number of bytes required by each picture block among BPLX written once in the memory block 79, it is always essential to connect the last BPLX of a certain effective sync block to the first BPLX of a subsequent effective sync block. This operation is done utilizing a supplemental flag called TERMBP.

The supplemental flag TERMBP is a flag for identifying the last BPLX of an effect sync block in the reading operation, and TERMBP represents a high level only when attached to the last BPLX of an effective sync block. The supplemental flag TERMBP is generated in the write control circuit 93 and written in the memory block 79 together with BPLX. Since the code arrangement pattern of an effective sync block puts BPLX in the last position of an effective sync block, regardless of the type, a pattern of TERMBP which represents a high level at the last BPL slot is prepared for each type of the effective sync blocks, and this TERMBP is written in the memory block 79 together with BPLX. In this fashion, only TERMBP of the last BPLX in the effective sync blocks automatically represents a high level.

Figure 15B:
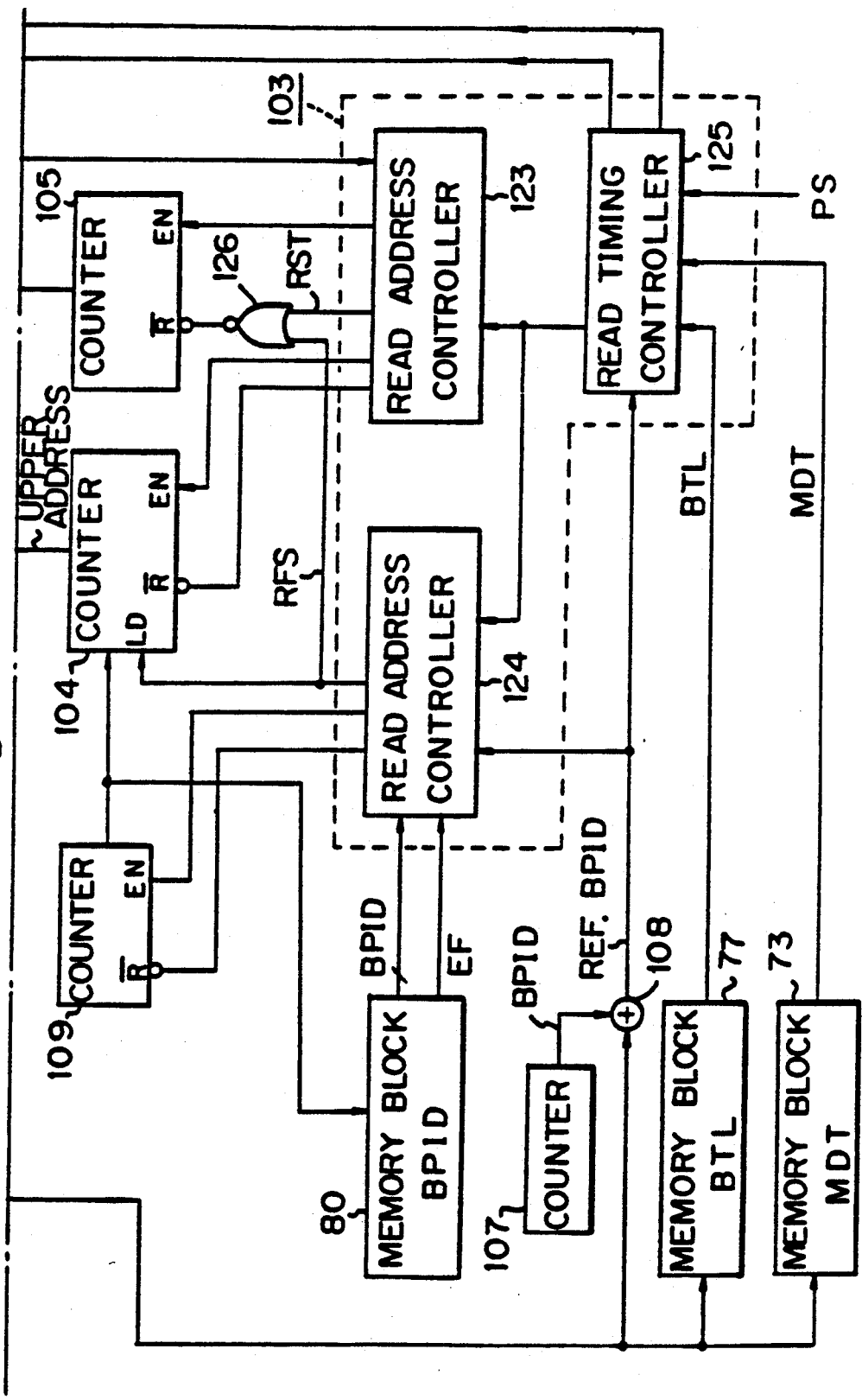

FIGS. 15A and 15B illustrate an arrangement of the reading circuitry. MSB and EF (error flag) read out of the memory block 78 are fed to the parallel-serial converting circuit 110 via a register 121. BPLX, EF and TERMBP read out of the memory block 79 are supplied to a register 122, and BPLX and EF are fed to the parallel-serial converting circuit 110. For purposes of detecting the last BPLX of an effective sync block, the supplemental flag TERMBP is supplied to a read address controller 123 of the read control circuit 103. The read control circuit 103 further includes another read address controller 124 and a read timing controller 125.

The read timing controller 125 is a circuit which obtains the timing for reading BPL from BTL and MDT for every picture block and gives a reading request signal to read address controllers 123 and 124.

The read address controllers 123 and 124 generate control signals to the respective address counters every time that the BPLX reading request signal is outputted from the read timing controller 125. The read address controller 123 generates a count enable signal and a reset signal and gives them, respectively, to the counter 104 for generating the upper reading address (the number of the effective sync block) and the counter 105 for generating the lower reading address. The read address controller 124 generates a load signal for the counter 104 and generates a count enable signal and a reset signal for the counter 109 which generates a reading address of the memory block 80 of BPID.

The reset signal for the counter 105 is generated by a NOR gate 126. The NOR gate 126 is supplied with a reset signal RST and a reset signal (refresh request signal) RFS. Therefore, the refresh request signal RFS generated by the read address controller 124 has the priority of the reset signal RST.

The BPLX reading address counters 104 and 105, in the presence of any error, require the refresh request signal RFS generated by the read address controller 124, but in an error-free condition and after entry of RFS at the beginning of every two frames, it is merely operative with the control signal outputted from the read address controller 123.

Upon reading the first BPLX of every two frames, the refresh signal RFS loads "0" (indicative of the BPID reading address) in the counter 104 and resets the counter 105. Therefore, the reading address is then (0, 0), and BPLX reading starts from this address.

In the second and subsequent readings, the read address controller 123 refers to the flag TERMBP which is read out together with BPLX, and judges whether BPLX is written subsequent to the same upper address or not. If they are serial, the address counter 105 is incremented upon the next reading. If they are not serial, the counter 105 is reset and counter 104 is incremented. Thereafter, this reading operation is repeated.

If any error, in particular, in THR, MDT or DR, is produced in the reading and reproducing process, the writing circuitry cannot identify the kind of code present in the MBP slot. Therefore, the reading circuitry cannot know what BPLX bytes are required for a picture block, and a BPLX propagation error occurs. Referring to BPID, a refresh operation is effected to cut off such a propagation error.

If the kind of code present in a certain MBP slot is not identified in the writing process, the error extends from here to the last BPLX of the effective sync block to which the slot belongs. Therefore, the propagation error in writing may occur in effective sync blocks of B1 and B2 types having BPLX slots, but does not occur in A-type effective sync blocks (see FIG. 8).

Figure 16:
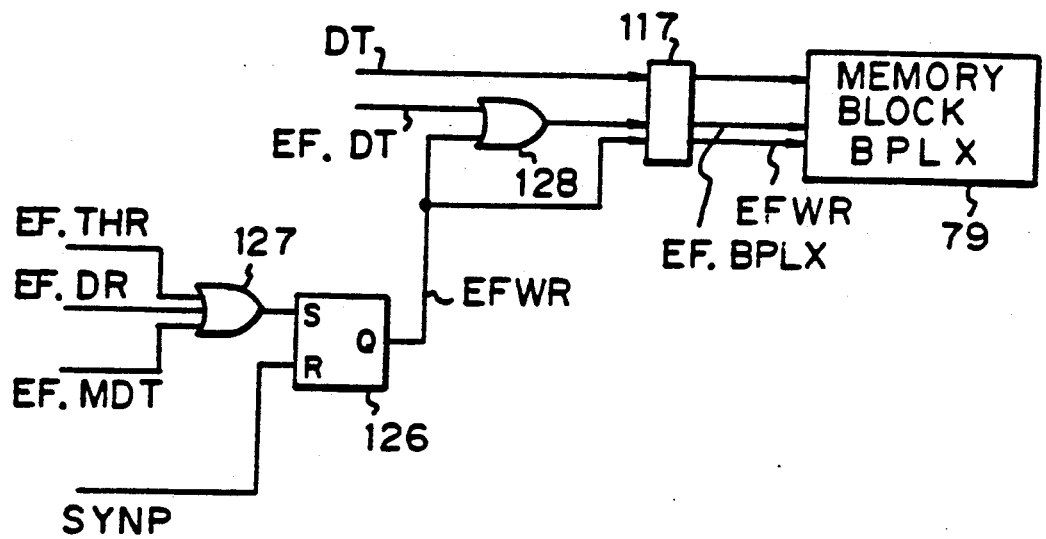
FIG. 16 is a block diagram of a writing-attendant propagation error flag generating circuit.

FIG. 16 shows an arrangement of a circuit provided in the write control circuit 93 to generate a writing-attendant propagation error flag EFWR. Reference numeral 126 designates a flip-flop. The flip-flop 126 is supplied with an output signal of an OR gate 127 as a set input thereof and a sync pulse SYNP as a reset input thereof. To the OR gate 127 are supplied a flag EF.THR indicative of the presence or absence of an error regarding THR, EF.DR indicative of the presence or absence of an error in DR, and EF.MDT indicative of an error in MDT. The flip-flop 126 generates the propagation error flag EFWR which is fed to an OR gate 128 and the register 117. An output signal of the OR gate 128 is supplied to the register 117. An output signal of the register 117 is supplied to the memory block 79.

The output signal of the OR gate 128 is written in the same address as BPLX in attachment therewith as an error flag. The propagation error flag EFWR is also written in the same address independently. The read address controller 123 (see FIG. 15B), when detecting that the detected EFWR is a high level, stops the BPLX reading address. When EFWR is a high level, EF.BPLX is also a high level.

Figure 17:
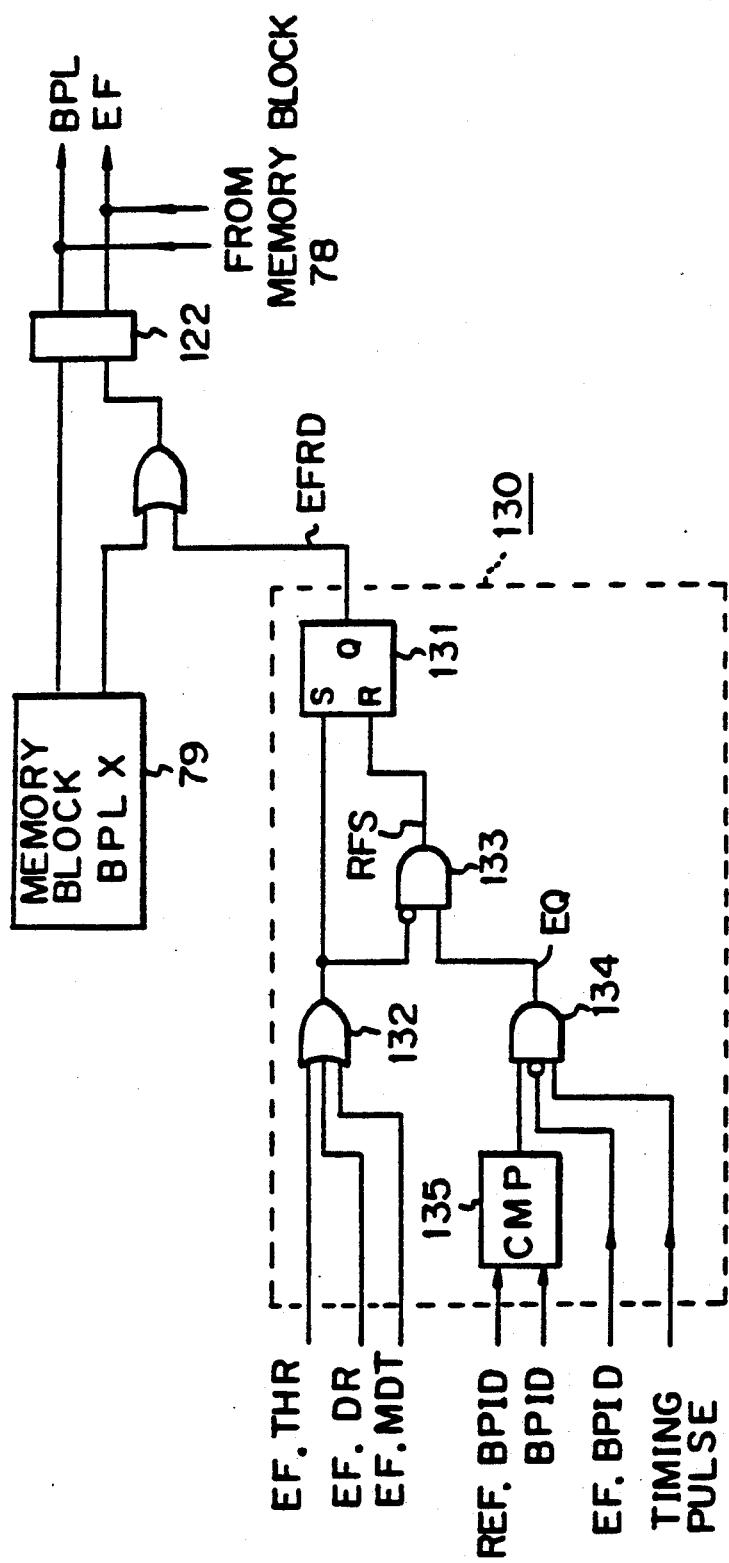
FIG. 17 is a block diagram of a reading-attendant propagation error flag generating circuit.

The propagation error in writing is explained below. When any error is produced in the BTL or MDT of a certain picture block, the read timing controller 125 cannot know the number of bytes of MSB and BPLX to be read in the picture block. As a result, a propagation error in reading occurs in BPLX alone. FIG. 17 shows an example of a circuit 130 (shown as encircled by a dash line) for generating a flag EFRD indicative of the presence of the reading-attendant propagation error. The read address controller 124 includes a circuit for generating the flag EFRD.

An output signal of an OR gate 132 is supplied as a set input of a flip-flop shown at 131. As a reset input of the flip-flop 131 is supplied an output signal of an AND gate 133 (refresh request signal RFS). The AND gate 133 is supplied with an inverted version of the output signal of the OR gate 132 and an output signal EQ of an AND gate 134. The AND gate 134 is supplied with an output signal of a comparator circuit 135, EF.BPID indicative of the presence or absence of an error regarding BPID and a timing pulse defining the comparison timing. The comparator circuit 135 detects coincidence between BPID read out of the memory block 80 and reference BPID from the adding circuit 108 (see FIG. 15), and generates a comparison output which represents a high level upon coincidence between them.

When one of EF.THR, EF.DR and EF.MDT represents a high level, the error flag EFRD generated by the flip-flop 131 is set and represents a high level. Since the error flag of BTL is a logic sum of the error flag of THR and the error flag of DR, error flags of THR and DR obtained in the reading side are used in lieu of the BTL error flag. The reading attendant propagation error flag EFRD is not brought low but maintains a high level until refreshed.

Both the writing-attendant propagation error flag EFWR and the reading-attendant propagation error flag EFRD are changed to low levels by the refreshing operation.

Such refresh operation is performed by referring to BPID attached to each effective sync block. All of the BPID are written in the memory block 80 in the writing period, using the effective sync block numbers as their addresses. When the reading period begins, the BPID of the first effective sync block is immediately read out of the memory block 80, and it is fed to the comparator circuit 135 as one of its inputs. As its other input, the comparator circuit 135 is supplied with the reference BPID generated in the counters 100 and 107 controlled by the read timing generating circuit 98.

Since the reference BPID is also fed to the BPLX read timing controller 125, the BPID read timing controller 125, at the timing of the reference BPID, generates a BPLX read request signal according to the value of BTL or MDT for every picture block, and supplies the signal to the read address controllers 123 and 124.

When the comparator circuit 135 detects coincidence between BPID and reference BPID and no error is present in THR, DR and MDT, the refresh request signal RFS is generated from the AND gate 133. RFS indicates that the time has come for reading the head BPLX of the effective sync block to which BPID then inputted in the comparator circuit 135 belongs. As shown in FIG. 15B, the refreshing operation is effected by the refresh request signal RFS by loading the BPID reading address from the counter 109 into the BPLX upper reading counter 104 and resetting the BPLX lower reading counter 105. By the compulsive operation of the reading address, the BPLX of a new effective sync block is read out with proper timing.

When the reading address is stopped because the error flag has been continuously set after detection of a writing-attendant propagation error, the reading address is renewed by the above-indicated refreshment. Therefore, the writing-attendant propagation error flag is automatically reset. The reading-attendant propagation error flag, although held set since an error has occurred in one of the THR, DR and MDT codes of a certain picture block, is reset upon the refreshment.

Figure 18:
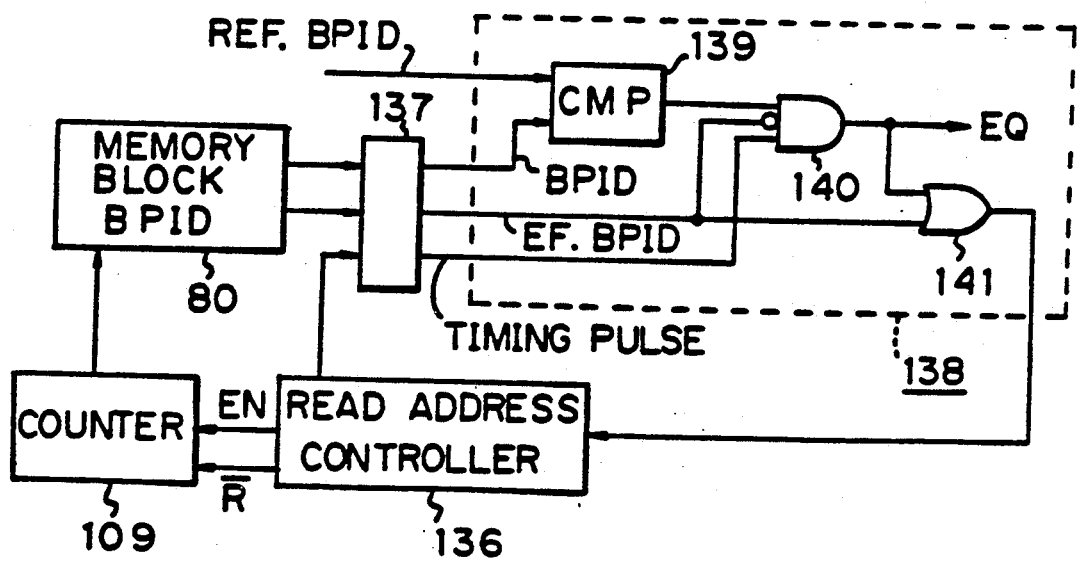
FIG. 18 is a block diagram of a BPID read controller.

Once refreshment is effected, then the BPID reading address is incremented by a BPID read address controller shown at 136 in FIG. 18 for attendance to a subsequent possible propagation error, and it is supplied to a comparator circuit 139. This process occurs in every refreshment. It may occur that an error is produced in BPID. In this case, judging that the opportunity of refreshment by BPID is lost, the read address controller 136 further increments the read address, and a subsequent BPID is fed to the comparator circuit 139. If the error in BPID continues, this operation is repeated.

The comparator 139, AND gate 140 and OR gate 141 form a BPID read address controller 138 shown as encircled by a dash line. The read address controller 138 is a part of the BPLX read address controller 124. Reference numeral 137 denotes a register provided in the reading side of the BPID memory block 80. An output signal of the comparator circuit 139, an error flag EF.BPID and a timing signal (timing pulse) are fed to the AND gate 140, and a signal EQ for forming a refresh request signal RFS is generated from the AND gate 140. This signal EQ and EF.BPID are fed to the OR gate 141, and an output signal of the OR gate 141 is supplied to the read address controller 136.

g. Modifications

In the above-described embodiment, the dynamic range DR and the minimum value MIN are transmitted as dynamic range information. However, any desired two of the dynamic range DR, minimum value MIN and maximum value MAX may be transmitted.

This invention may be used in a buffering system co-using a process of controlling the amount of generated information by varying the threshold for identifying whether a picture block is a still block or a moving block in addition to a control using the above-described threshold THR.

According to the invention in which a most significant bit (MSB) of a bit plane is inserted in a predetermined position of a sync block of an output signal of the frame segmentation circuit, the circuit never fails to restore a binary picture even in the picture search mode where reproduced data is obtained for each sync block unit.

In the above-described embodiment, MBP slots are provided in which MSB might or might not be included. Therefore, the frame desegmentation circuit reproduces the bit length of the bit plane of the picture block from the threshold code THR and the dynamic range DR, and judges that effective MSB is present in the MBP slot when the bit length is 1 or more. Therefore, THR and DR are important for processing MSB. In this connection, threshold codes are inserted in all sync blocks, and errors in THR are prevented by majority processing.

In addition, since the threshold code THR is inserted in a predetermined position of each sync block of the output signal of the frame segmentation circuit, the proper threshold code THR can be established in the majority logic by feeding the threshold code THR of each sync block to the majority block in the reproducing side. Therefore, it is possible to avoid the situation in which the data of each picture element in the block cannot be decoded, caused by an error in the threshold code THR. Further, in the picture search mode in which reproduced data is obtained in each sync block unit, the proper threshold code THR is obtained. Therefore, the bit length can be restored from THR and DR for each picture block, and a binary picture is restored, using an existing effective MSB when the bit length is 1 or more.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

We claim:

1. A highly efficient coding apparatus for coding digital video data in the form of blocks of digital video data representing plural picture elements so as to provide compressed video data for transmission by data transmission means having a predetermined transmission capacity, comprising:

block segmentation means supplied with input video data for generating a series of blocks of digital video data representing plural picture elements, encoding means for encoding the digital video data in each block with a variable digitized bit number determined by characteristics of each block so as to provide coded data of variable bit length, and frame segmentation means for generating a series of sync block data, each of which includes a plurality of blocks of coded data, and at least the most important data portions of the coded data being located in predetermined portions of each sync block.

2. A highly efficient coding apparatus according to claim 1, wherein said frame segmentation means is operative to provide each sync block with a block identification code therein identifying a block number thereof.

3. A highly efficient coding apparatus according to claim 1, wherein said frame segmentation means is operative to provide data representing said characteristics of each block in predetermined portions of a respective sync block.

4. A highly efficient coding apparatus according to claim 1, wherein said encoding means comprises:

first detecting means for detecting a maximum value of the digital video data of plural picture elements in a respective block;

second detecting means for detecting a minimum value of the digital video data of plural picture elements in said respective block;

means for generating dynamic range information of the block from said maximum and minimum values;

means for subtracting said minimum value from each of the digital video data to generate modified digital video data;

means for encoding said modified digital video data with said variable digitized bit number determined by said dynamic range information to provide said coded data; and transmitting means for transmitting said coded data and an additional code per block formed of at two of said maximum value, minimum value, and a signal representing said dynamic range information.

5. A highly efficient coding apparatus according to claim 1, wherein said frame segmentation means is operative to provide most significant bits of the coded data as said most important data portions of the coded data.

6. A highly efficient coding apparatus according to claim 1, wherein said encoding means includes control means for controlling the amount of coded data produced thereby during a predetermined period such that it is less than said transmission capacity by means of a threshold value determined for each said predetermined period, and wherein said frame segmentation means is operative to include a respective threshold value in every sync block.

7. A highly efficient coding apparatus according to claim 6, wherein said frame segmentation means is operative to include said respective threshold value in a beginning portion of each said sync block.

* * * * *